(12) United States Patent
Ben-Itzhak

(10) Patent No.: US 7,313,822 B2
(45) Date of Patent: Dec. 25, 2007

(54) APPLICATION-LAYER SECURITY METHOD AND SYSTEM

(75) Inventor: Yuval Ben-Itzhak, Kiron (IR)

(73) Assignee: Protegrity Corporation, Stamford, CT (US)

( * ) Notice: Subject to any disclaimer, the term of this patent is extended or adjusted under 35 U.S.C. 154(b) by 750 days.

(21) Appl. No.: 09/809,030

(22) Filed: Mar. 16, 2001

(65) Prior Publication Data

US 2003/0023873 A1 Jan. 30, 2003

(51) Int. Cl.
  G06F 11/00 (2006.01)
  G06F 12/14 (2006.01)
  G06F 12/16 (2006.01)
  G06F 15/18 (2006.01)
  G08B 23/00 (2006.01)
  G06F 11/30 (2006.01)
  G06F 15/173 (2006.01)
  G06F 15/16 (2006.01)
  H04L 9/00 (2006.01)
  H04K 1/00 (2006.01)

(52) U.S. Cl. .............. 726/24; 726/22; 726/23; 726/24; 726/25; 713/187; 713/188; 713/189; 713/152; 713/165; 709/223; 709/224; 709/225; 709/226; 709/227; 709/228; 709/229

(58) Field of Classification Search ........ 713/151–154, 713/160, 165, 200–201, 187–189; 709/223–230; 726/22–25
See application file for complete search history.

(56) References Cited

U.S. PATENT DOCUMENTS

| | | | |
|---|---|---|---|
| 4,734,853 A | 3/1988 | Nakano | |
| 5,073,933 A | 12/1991 | Rosenthal | |
| 5,166,977 A | 11/1992 | Ross | |
| 5,191,611 A | 3/1993 | Lang | |
| 5,220,604 A | 6/1993 | Gasser et al. | |
| 5,224,163 A | 6/1993 | Gasser et al. | |
| 5,315,657 A | 5/1994 | Abadi et al. | |

(Continued)

FOREIGN PATENT DOCUMENTS

WO  WO0016200  3/2000

(Continued)

OTHER PUBLICATIONS

BRP Publications, Sep. 7, 1999, AppShield Provides Block Against Application Hacks, vol. 6, iss. 16.*

(Continued)

*Primary Examiner*—Ayaz Sheikh
*Assistant Examiner*—Shin-Hon Chen
(74) *Attorney, Agent, or Firm*—Paul, Hastings, Janofsky & Walker, LLP

(57) ABSTRACT

The present invention secures applications from executing illegal or harmful operation requests received from a distrusted environment, thereby, preventing an application from damaging itself, other applications, performance, files, buffers, databases, and confidentiality of information. An operation reverse engineering layer is positioned in front of an application in a trusted environment and between the application and the incoming application operation requests that are received from an unknown or distrusted environment. The operation reverse engineering layer checks the requests for either form, content, or both, to insure that only legal and harmless requests will pass to the given application. Hardware, software, or both, are employed to implement the operation reverse engineering layer.

22 Claims, 16 Drawing Sheets

U.S. PATENT DOCUMENTS

| | | | |
|---|---|---|---|
| 5,317,742 A * | 5/1994 | Bapat | 707/3 |
| 5,347,578 A | 9/1994 | Duxbury | |
| 5,559,800 A | 9/1996 | Mousseau et al. | |
| 5,566,326 A | 10/1996 | Hirsch et al. | |
| 5,611,048 A | 3/1997 | Jacobs et al. | |
| 5,623,600 A | 4/1997 | Ji et al. | |
| 5,623,601 A * | 4/1997 | Vu | 713/201 |
| 5,629,981 A | 5/1997 | Nerlikar | |
| 5,657,390 A | 8/1997 | Elgamal et al. | |
| 5,724,355 A | 3/1998 | Bruno et al. | |
| 5,774,695 A | 6/1998 | Autrey et al. | |
| 5,778,189 A | 7/1998 | Kimura et al. | |
| 5,870,544 A | 2/1999 | Curtis | |
| 5,892,900 A | 4/1999 | Ginter et al. | |
| 5,908,469 A | 6/1999 | Botz et al. | |
| 5,910,987 A | 6/1999 | Ginter et al. | |
| 5,917,912 A | 6/1999 | Ginter et al. | |
| 5,933,498 A | 8/1999 | Schneck et al. | |
| 5,941,947 A | 8/1999 | Brown et al. | |
| 5,944,794 A | 8/1999 | Okamoto et al. | |
| 5,949,876 A | 9/1999 | Ginter et al. | |
| 5,974,549 A * | 10/1999 | Golan | 726/23 |
| 5,982,891 A | 11/1999 | Ginter et al. | |
| 5,983,270 A | 11/1999 | Abraham et al. | |
| 6,092,194 A * | 7/2000 | Touboul | 726/24 |
| 6,154,844 A * | 11/2000 | Touboul et al. | 726/24 |
| 6,199,181 B1 * | 3/2001 | Rechef et al. | 714/38 |
| 6,311,278 B1 | 10/2001 | Raanan et al. | |
| 6,317,868 B1 * | 11/2001 | Grimm et al. | 717/127 |
| 6,321,337 B1 * | 11/2001 | Reshef et al. | 713/201 |
| 6,356,906 B1 * | 3/2002 | Lippert et al. | 707/10 |
| 6,584,569 B2 * | 6/2003 | Reshef et al. | 713/201 |
| 6,668,282 B1 * | 12/2003 | Booth et al. | 709/224 |
| 6,684,329 B1 * | 1/2004 | Epstein et al. | 713/150 |
| 6,782,418 B1 * | 8/2004 | Cerrone et al. | 709/217 |

FOREIGN PATENT DOCUMENTS

| | | |
|---|---|---|
| WO | WO 0016200 | 3/2000 |
| WO | WO0016206 | 3/2000 |
| WO | WO 0016206 | 3/2000 |

OTHER PUBLICATIONS

Messmer, New Tool Blocks Wily E-Comm Hacker Tricks, Aug. 30, 1999.*
Yasin, App Security Vaults to Fore. InternetWeek, Sep. 6, 1999.*
Kessler, Securing Your Web Site, Feb. 2000.*
E-Business Application Security Software, Oct. 1999, p. 1-2.*
http://www.f5 networks.com, TrafficShield Application Firewall, p. 1-2.*
Schultz, Firewall Appliances, InternetWeek, Feb. 21, 2000.*
"AppShield Provides Block Against Application Hacks", Report on Electronic Commerce, vol. 6, (1999).
Messmer E.; "New Tool Blocks Wily E-Comm Hacker Tricks", Network World, p. 15, (1999).
Hulme, G.; "Hackers Sneak Through Open Doors In Applications", Buisness Week, 68-70, (2002).

* cited by examiner

APPLICATION-LAYER SECURITY METHOD AND SYSTEM

BACKGROUND OF THE INVENTION

1. Field of the Invention

The present invention relates to an application-layer security method, system, and computer readable medium for protecting trusted computer applications from executing illegal or harmful operations requested from an unknown or distrusted network. Particularly, the invention relates to application-layer security for preventing resources from being accessed by intruders directly through public networks, e.g., the Internet.

2. Description of Background

The ease, accessibility, and convenience of the Internet has rapidly changed the way people use computers and access information. The World Wide Web ("WWW"), often referred to as 'The Web,' is the most popular means for retrieving information on the Internet. The Web gives users access to an almost infinite number of resources such as interlinked hypertext documents accessed by a hypertext transfer protocol ("HTTP") from servers located around on the world. The Web operates in a basic client-server format, wherein servers are dedicated computers or individual computer programs that store and transmit resources, e.g., documents and binary objects, to other computers on the network when instructed to do so. Clients are programs that request these resources from a server instructed by a user. A browser is a software program that allows users to view the retrieved documents.

Documents on the Web, referred to as Web pages, are written in a hypertext markup language ("HTML"), or a similar language, and identified by uniform resource locators ("URLs") that specify a particular machine and pathname by which a file can be accessed. Codes, often referred to as tags, embedded in an HTML document associate particular words and images in the document with URLs so that a user can access another file or page by the press of a key or the click of a mouse. These files can comprise text, images, videos, and audio as well as applets or other small embedded software programs, written in for example, Java or ActiveX, that execute when the user activates them by clicking on a hyperlink. A user visiting a Web page also may be able to use components that supply information to a server through the use of forms, download files from a file transfer protocol ("FTP") site, participate in chat areas, conduct business transactions, and send messages to other users via e-mail by using links on the Web page.

Unfortunately, the components that legitimate users desire and that make a web site spectacular, can also make a server, and the network attached, vulnerable to attack from the malicious, irresponsible, or criminally minded individual. This is referred to as "web hacking" and generally involves taking advantage of mistakes in Web design. Particularly, the easier it is for users to talk directly to the server through a web page, the easier it is for someone to hack into the system. Typical attacks include, but not limited to, defacing a page by deleting graphics and replacing them with doctored, sometimes lurid, graphics; altering or stealing password files; deleting files; tampering with credit and debit card numbers, and other customer information; publicizing private business information; reviewing confidential information; and searching through internal databases. Thus, web hacking causes inconvenience and perhaps irreversible damage to users, businesses, and operators of the system.

Web hacking is different from traditional system or application hacking because an attack takes place over application-layer protocols, e.g., HTTP via transmission control protocol ("TCP") port 80. Unfortunately, conventional computer security methods fail to address or completely ignore Web hacking. For a complete understanding of the inadequacy of conventional methods, one must understand communications protocol. Particularly, the International Organization for Standardization ("ISO") developed a set of rules or standards designed to enable computers to connect with one another and to exchange information with as little error as possible. The protocol generally accepted for standardizing overall computer communications is a seven-layer set of hardware and software guidelines known as the open systems interconnection ("OSI") model. This protocol forms a valuable reference model and defines much of the language used in data communications.

FIG. 1 depicts an OSI architecture and the layers occupied by three widely employed conventional security methods. These conventional security methods are implemented between either the data link layer and physical layer, e.g., firewall, or the session and transport layers, e.g., secure socket layer ("SSL") and public key infrastructure ("PKI").

A firewall is a type of security intended to protect an organization's network against external threats coming from another network, such as the Internet. A firewall prevents computers in the organization's network from communicating directly with computers external to the network and vice versa. Instead, all communication is routed through a proxy server outside of the organization's network, and the proxy server decides whether it is safe to let a particular message type or file type pass through, based on a set of filters, to the organization's network.

A secure socket layer is an open standard developed by Netscape Communications® for establishing a secure and encrypted communications channel to prevent the interception of critical information, such as credit card information. The primary purpose of secure sockets layer is to enable secure and encrypted electronic transactions on public networks, such as the Web.

A public key infrastructure or trust hierarchy is a system of digital certificates, certificate authorities, and other registration authorities that verify and authenticate the validity of each party involved in an Internet transaction. PKIs are currently evolving and there is no single PKI nor even a single agreed-upon standard for setting up a PKI.

A drawback of the above-mentioned conventional technologies is that they only secure the perimeter of networks and they perform no application-content or application's business logic checking of operation requests at the application layer. Therefore, these conventional technologies can not prevent attacks that arise from the content of an operation request.

In web applications, web hackers can easily attack computer systems by exploiting flaws and vulnerabilities in web design. For example, default scripts may allow files to be uploaded onto a Web server; a Web server's treatment of environmental variables may be exploited; and the existence of 'backdoors' or flaws in third party products allow unauthorized access. These techniques can be potent attacks and are difficult to defend against. More disturbingly, each month new software vulnerabilities are discovered, but many system operators leave these holes unpatched and their systems open to preventable attacks.

Major corporations and government agencies utilizing well configured firewalls, PKI, and SSL implementations have been infiltrated by hackers using known application level intrusions. These intrusions typically involve illegal and harmful requests that are sent to an application forcing it to execute out of its intended scope of operation. This may exploit the application to damage itself, files, buffers, other applications, performance, or confidentiality of information.

There are two techniques that attempt to address these problems. However, both involve a single solution to solve the wide variety of application layer problems. For example, one technique involves wrapping a server operating system to track for suspicious events such as deleting a file or formatting a disk. A second technique involves the installation of a network filter in front of an application and updating the filter database with known patterns that can effect the application. However, it is impossible to solve all application layer problems with only a single solution to provide full protection. For example, working only in the operating system will not have an "application process context." Further, installing a filter with known hacking patterns to match will not protect against unknown vulnerabilities or manipulations of environmental variables or the application's implemented business process.

In addition, none of the conventional solutions address the increased hacking opportunities caused by the proliferation of electronic commerce ("e-commerce"), mobile, and interactive television ("iTV") applications. These applications generally require the combination of numerous components working together using different technologies, e.g., Web server, transaction server, databases, Java, ActiveX, and Flash objects. Further, each component has its own unique security needs. Further, because these components and the networks they run on are changing dynamically and almost instantaneously, the problem is very complex.

SUMMARY OF THE INVENTION

The present invention is directed to computer security at the application layer. The application layer is the highest layer of standards in the OSI model shown in FIG. 1. Further, the application layer is concerned with the requirements of the application. Particularly, the application layer contains the operations requested by a user, as opposed to lower layers, which control the transmission of data between and a sender and receiver. All application processes use the elements provided by the application layer. For example, service elements include library routines which perform inter-process communication, provide common procedures for constructing application protocols, and for accessing the services provided by servers which reside on the network.

The present invention is focused on preventing unauthorized use of a computer application at the application layer. Particularly, preventing web resources and information from being accessed or executed by intruders directly through the application itself. A system, method, and computer readable medium are implement the use of a plurality of security techniques, either operating alone or in combination, to identify if any part of an operation request's contents are illegal or harmful to a trusted application, thereby protecting a trusted application against web related threats.

An object of the invention is to limit the possible operation requests from an external distrusted environment, by eliminating illegal and harmful requests, to an application in an internal trusted environment. Another object of the invention is to prevent an application from being requested to execute out of its intended scope of operation. Another object is to find if a given request is legal and a respective outgoing reply is trivial to a given application.

It is another object of the invention to allow system operators to specify sets of requests operations to be processed by an application and to prevent any operation request other than those specified to pass to the internal environment.

In an embodiment of the invention, a method for protecting an application from executing an illegal or harmful operation request received from a distrusted environment comprises the steps of determining whether the operation request is illegal or harmful to an environment of the application, and preventing an application from executing an illegal or harmful operation request. Illegal and harmful operation requests may cause damage or allow unauthorized access to a the application, other applications, a trusted network, one or more data files, memory, buffers, performance, confidential information, hardware, software, a database, an information server, and the like. For example, illegal and harmful operation request may be database manipulations; attacks on known Internet information server vulnerabilities or application vulnerabilities; URL manipulations; business process manipulation; and the like. When a operation request is identified to be illegal or harmful, that request may be rejected entirely, or modified into or replace with a legal or harmless operation request.

A feature of the invention is that one or more pipes relating to specific types of security threats are applied to each application path. In an embodiment of the invention, a database driven pipe involves database operations and is aimed at finding patterns that show malicious intentions in a database request. Particularly, the contents of incoming database requests are inspected for permitted syntax based on the type of database used and the existence of one or more embedded harmful SQL commands.

In another embodiment of the invention, a deterministic type pipe inspects incoming operation requests for known vulnerability patterns. All known application vulnerabilities, and the respective requests that take advantage thereof, are stored and compared to the incoming request. If the comparison results in a match, the incoming request is blocked and is not allowed to proceed to the application. Further, this pipe can shield applications against unknown vulnerabilities by eliminating the use of executables, methods, and scripts, that if accessed or executed, could negatively affect or allow illegal access to the application environment or servers.

In another embodiment of the invention, a content driven pipe of HTML/WML/XML insures that an application operates as designed and implemented by the application owner. Particularly, the pipe checks each outgoing reply for its internal URLs and parameters values, then validates the next user request to match one of the stored URLs and parameters. This method insures that subsequent user requests to the application are only those that the application previously allowed.

In another embodiment of the invention, an application-node blocking pipe restricts remote user requests from entering application nodes that are designated as restricted by an application owner. Application owners may sometimes keep applications running for fear of losing business, even though a vulnerability is known within the application, until a production patch is available. Using this pipe, application owners can block a vulnerable application-node from being accessed while keeping other application nodes available to users.

In another embodiment of the invention, a pipe blocks distrusted operation requests from being forward to a trusted environment or zone within a trusted network. By implementing this pipe, an administrator can restrict a remote user's specific messages to only those which are designated as allowed.

In another embodiment of the invention, a pipe validates an incoming parameter value according to pre-defined expression rules.

In another embodiment of the invention, a cookie-based pipe protects client side cookies from being modified or manipulated by the user. This pipe insures that internal information stored in the cookie will not be available to the user but will transparently be clear to the application without applying any change to the application itself.

In another embodiment of the invention, a learning pipe allows the parameters in a request to be "fine tuned" to better match the most common values entered by the clients, i.e., requesters, determined from a statistical model. A dynamic range of entered values is built for each parameter in a request that a client sends. Based on the statistical mode implemented, a range of probable, i.e., most often entered or expected values is computed and the values of operation request parameters may be adjusted based on the reply from the application.

An advantage of the invention is that only legal and harmless requests will pass to a trusted network and to all the trusted applications therein. Another advantage is that the present security system can protect an unlimited number of applications installed on a single or multiple application servers without modifying or installing any software on these servers.

A feature of the invention is that, based on the type of application, the number of pipes applied can be configured to the exact security need of the tunnel.

Another advantage of the invention is that any combination of pipes can be applied to an application according to the exact security needs of the application.

Another object of the invention is to prevent attacks from unknown vulnerabilities.

A feature of the invention is that the system may be updated to employ new pipes, implementing different security-layer methods, as they are developed. An advantage of this feature is that future developed pipes may be implemented in an application environment to address better or new methods to secure the application and to protect against new threats.

The present invention provides a robust, scalable, dynamic, effective and elegant solution to the problem of attacks implemented through the application layer.

The foregoing, and other features and advantages of the invention, will be apparent from the following, more particular description of the preferred embodiments of the invention, the accompanying drawings, and the claims.

BRIEF DESCRIPTION OF THE DRAWINGS

FIG. 1 depicts conventional security methods and the protocol layers that they operate in.

DETAILED DESCRIPTION OF THE INVENTION

Figure 1:
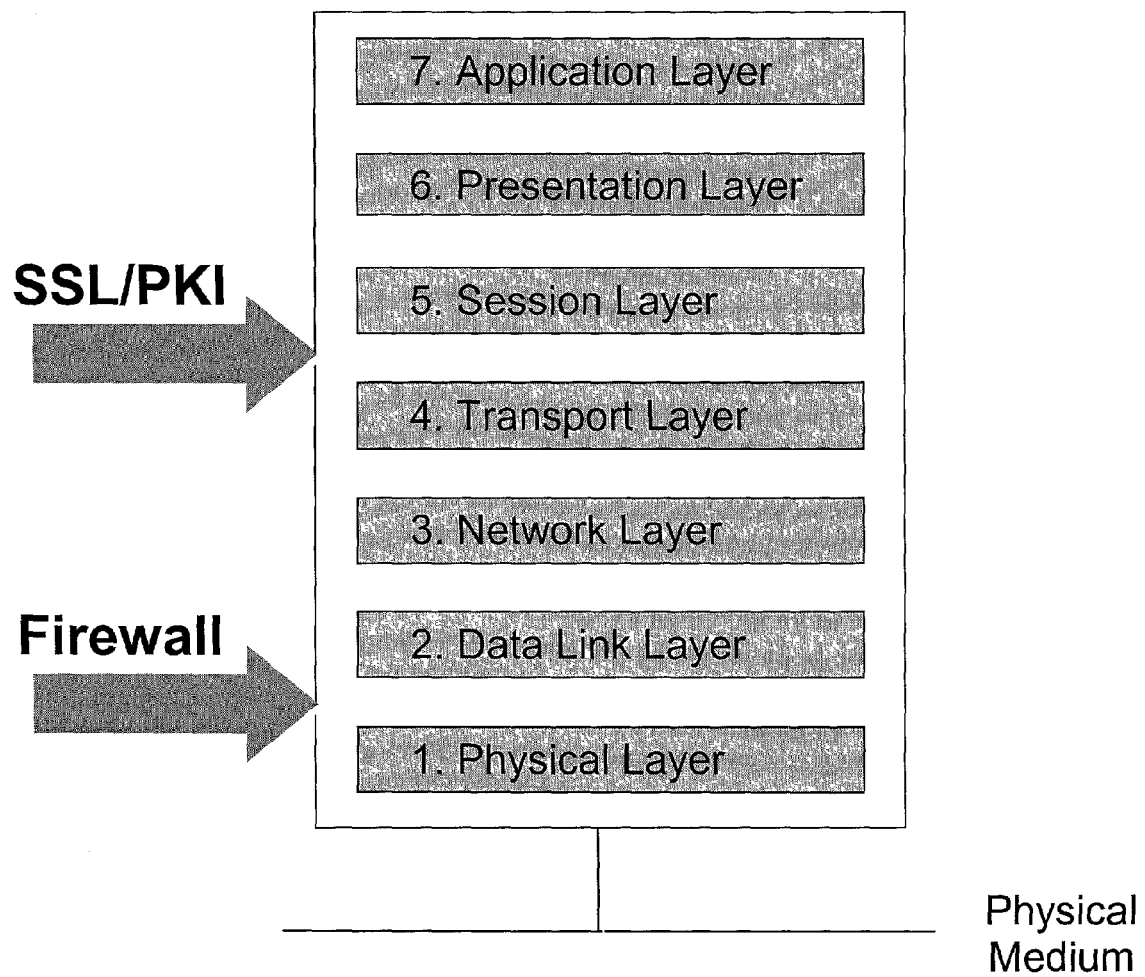

The preferred embodiments of the invention are now described with reference to the figures where like reference numbers indicate like elements. Also in the figures, the left most digit of each reference number corresponds to the figure in which the reference number is first used.

The preferred embodiments of the invention may be employed in Internet, Intranet, mobile communication, interactive TV networks, or any other application environment that uses application protocols, such as, but not limited to, hypertext transport protocol ("HTTP"), HTTPs, HTTPd, SOAP, WebDAV, and SMTP. However, the inventive concept can be practiced in any type of communication system where information is exchanged between a trusted application and a distrusted network. The invention is particularly suitable for protecting application service provider ("ASP"), business to commerce, and business to business network environments.

In the present invention, an application-layer security system, method, and computer readable medium are implemented to protect an application, a shared application, a distributed application, or multi-applications from being requested to execute out of their intended scope of operation, i.e., preventing such applications from damaging themselves, data files, buffers, other applications, performance, or confidentiality of information. Particularly, requests that are received from distrusted sources are subjected to one or more security techniques that check the contents of the requests to identify if the requests are illegal or harmful. The request's contents comprise the message header, message body, query string, encoding type, and the uniform resource identifier ("URI"). Requests that are identified to be illegal or harmful are rejected entirely or modified into, or replaced with, a legal request. Thus, only legal or harmless requests will pass to an application for execution.

In an embodiment of the invention, a security system is positioned in front of an application in a trusted environment. The security system implements a protective layer, i.e., application layer, between the application and the incoming application operation requests that are received from an unknown or distrusted environment. The protective layer, herein also referred to as an operation reverse engineering layer, checks the requests for either form, content, or both, to insure that only legal and harmless requests will pass to the given application. The security tunnel system may comprise hardware, software, or both, to implement the operation reverse engineering layer.

The invention complements conventional security technologies. For example, in an embodiment of the system a firewall is placed in between the distrusted network and the security system allowing the firewall to implement its security methods on the operation requests before they are passed along to the security system of the present invention. In alternative embodiments, the invention can be combined with any lower layer security technologies, such as, SSL or PKI.

Figure 2A:
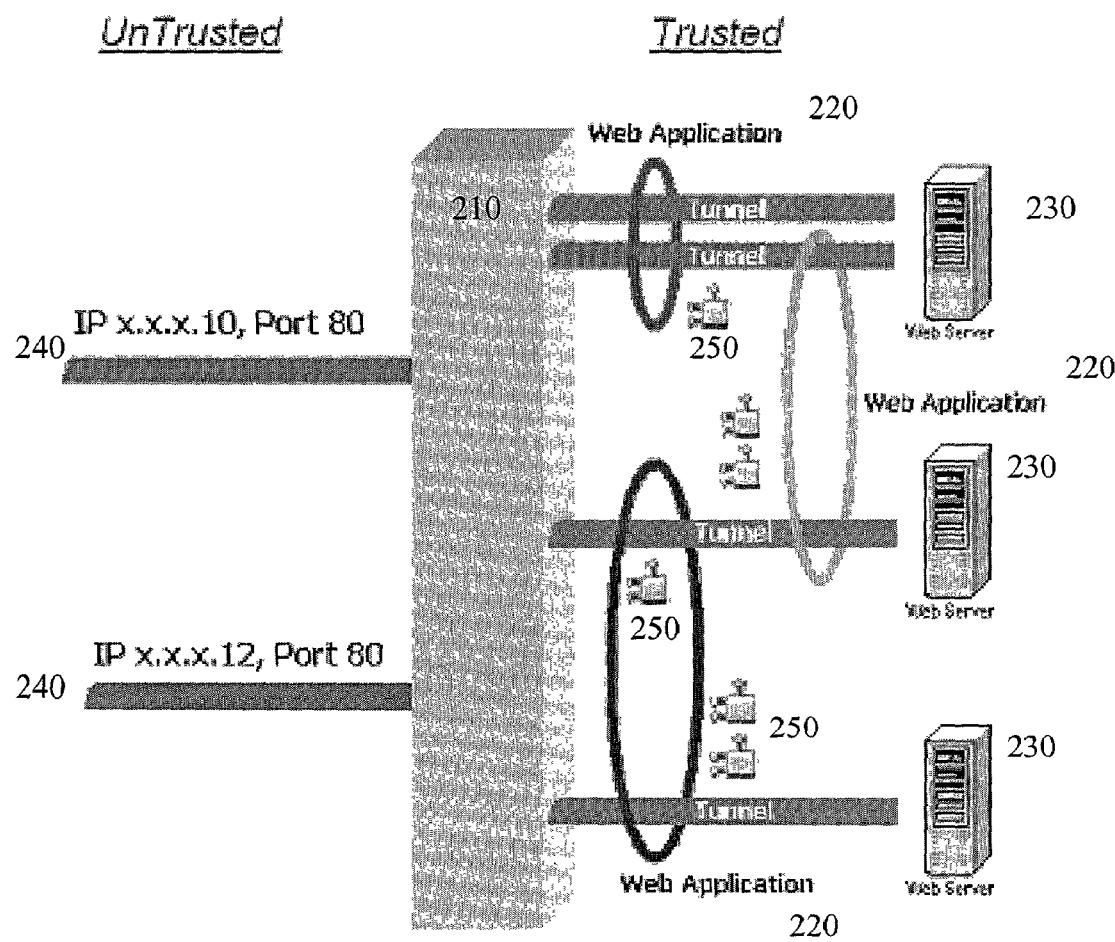
FIGS. 2(a)-2(e) illustrate an application layer security system in a web application configuration according to a preferred embodiment of the invention.
Figure 2B:
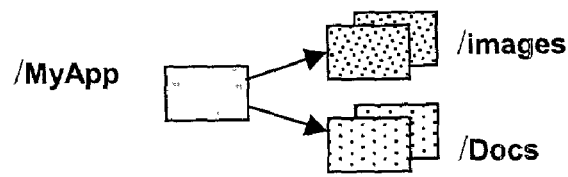

FIG. 2(a) illustrates a security system, according to a preferred embodiment of the invention which is configured for a web environment. Particularly, security system 210 is places between a distrusted network and one or more applications located on one or more web servers 230 in a trusted environment. Security system employs an operation reverse engineering layer between applications and incoming operation requests originating in the distrusted environment, e.g., a transmission control protocol/internet protocol ("TCP/IP") network. For example, incoming operations may be received as external HTTP traffic received via one or more ports 240. System 210 provides tunneling to support distributed, shared, or hosted servers and can represent html documents, cgi scripts, perl scripts, or anything executed on the server(s). Each application path is represented as a virtual directory or logical name on a web server representing a physical location of the application(s) on the server(s). For example, FIG. 2(b) depicts the virtual subdirectory /My App that comprises subdirectory /Images and /DOCS. Each one of these virtual directories represents an application path.

A tunnel is a protocol based, e.g., TCP/IP, connection between the distrusted and trusted zones. Network traffic traveling through a tunnel is separated into application paths using the requested message content. For example, in HTTP, an application path is a virtual directory defined on a web server that can be access via a specific tunnel. Each tunnel type implements and validates a different type of application protocol. For example, application protocols may be HTTP, HTTPs, SOAP, WebDAV, FTP, Telnet, and the like, or just a simple tunnel to forward incoming and outgoing streams.

Figure 2C:
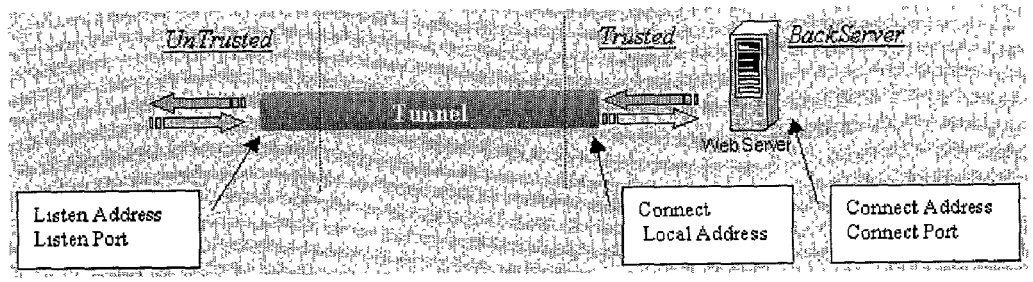
Figure 2D:
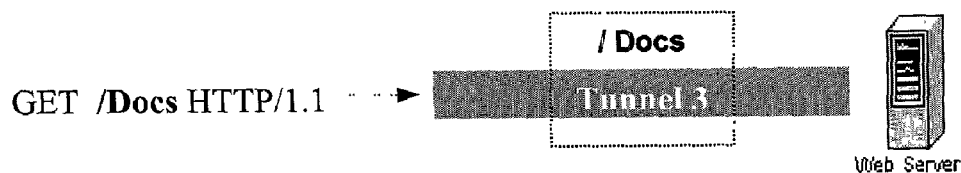

FIG. 2(c) depicts an example tunnel. Particularly, the tunnel communicates information between a listen address and port, on the distrusted network, and a connect local address, in the trusted network. The listen address and port receives incoming protocol, e.g., TCP/IP, requests. The connect local address receives information received through the tunnel and forwards it to the back-end application listening at its connect address and port. FIG. 2(d) depicts an example tunnel implementation. In this example, tunnel #3 is associated with subdirectory IDOCS. Therefore, a request for the display of an application, such as GET /DOCS in HTTP protocol, is transmitted through tunnel #3 to the respective application.

System 210 further comprises pipes 250. In the present invention, a pipe is a security component provided to protect or monitor functionality of the trusted applications. For example, a first pipe might protect against known application vulnerabilities, a second prevents database manipulations, and a third prevents parameters poisoning. One of ordinary skill can recognize that further pipes may represent additional security components. One or more pipes 250 may be implemented in one, several, or all application paths or tunnels in the system.

Figure 2E:
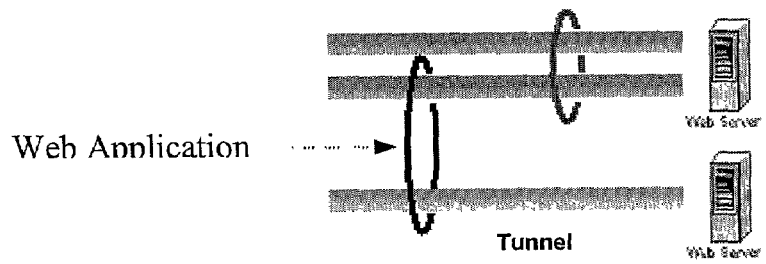

As depicted in FIGS. 2(a) and 2(e), security web applications 220 are logical entities wrapping or grouping tunnels, application paths, and pipes that together represent a protected application. When protecting an application distributed on several web servers, i.e., each html page is on a different machine, a single Web application entity represents the distribution. Web applications 220 provide specific security protection and monitoring to all traffic over selected application paths. A default web application is a logical entity representing security protection on all traffic over all tunnels not defined in of web applications 220. One or more pipes 250 are executed on traffic running in a tunnel. Further, web applications 250 can customize pipe execution to specific application paths.

System 210 may comprise hardware, software, or both to implement the operation reverse engineering layer. In an embodiment of the invention, system 210 is a stand-alone server positioned in between a distrusted and trusted network. In an alternative embodiment, system 210 is "plug and play" hardware, or the like, that can be installed on an existing server. In another embodiment of the invention, system 210 comprises only software components.

Security system 210 employs a method to implement the operation reverse engineering layer. In a preferred embodiment of the invention, the security method comprises the step of checking the contents of received requests for information that would classify the request as illegal or that would cause an application to execute out of its intended scope. Illegal or harmful requests can be rejected or replaced with or modified into a legal request. A request's contents comprises the message header, message body, query string, and the uniform resource identifier ("URI") and particularly the environment variables, commands, or parameters that the application will execute or interpret. The contents do not refer to the format or communications protocol that the message is transported in. However, the method may further comprise the step of checking the format of the received request. Content checking comprises the step of applying one or more pipes, i.e., security components, wherein each provides a specific protection or monitoring functionality. For example, a first pipe protects against known application vulnerabilities, a second prevents database manipulations, and a third prevents parameters poisoning.

Figure 3:
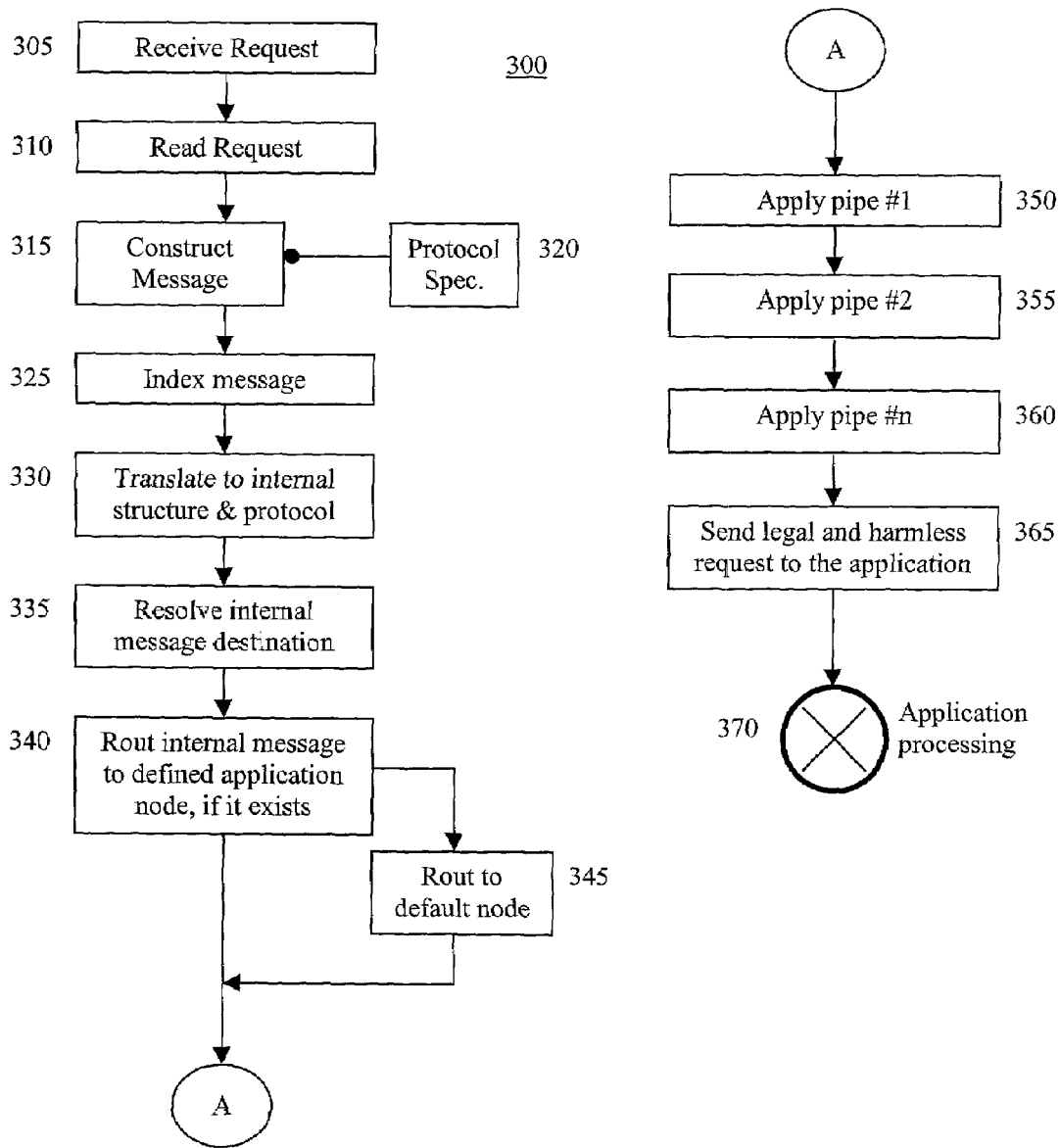
FIGS. 3 and 4 illustrate an application layer security method according to an embodiment of the invention.
Figure 4:
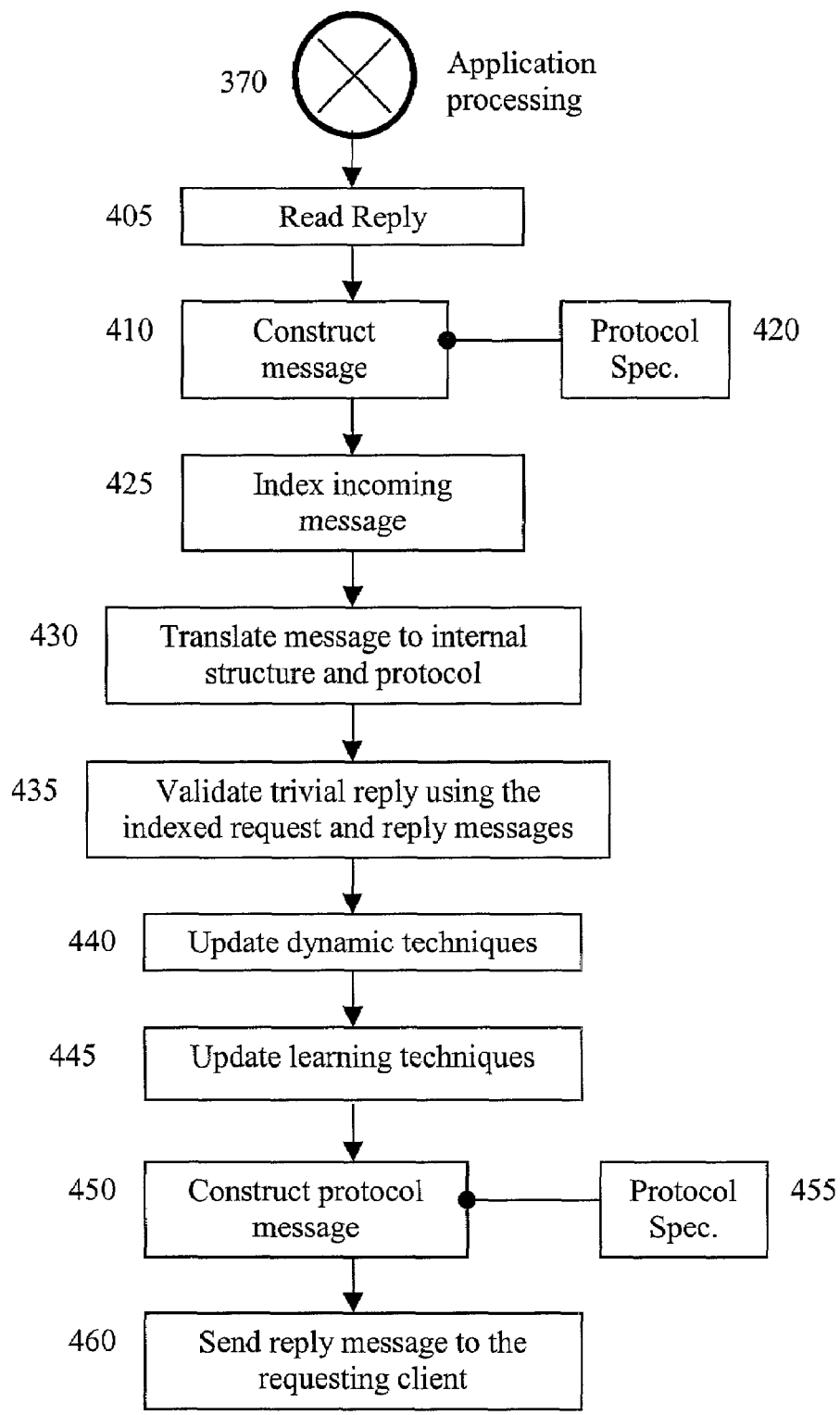

In another embodiment of the invention, security method 300, depicted in FIGS. 3 and 4, is employed to provide the operation reverse engineering layer. Particularly, FIG. 3 depicts the steps that are implemented prior to processing of the operation request by the application. FIG. 4 depicts the steps that occur after processing of the request and during the return of an application reply to the distrusted environment.

Referring to the left side of FIG. 3, destination identification and tunnel construction is first performed (steps 305-345) on the operation request. When a request for an application operation is sent from a distrusted network, the request is first received (step 305) at a queued socket server. This type of server is preferable because it prevents denial of services caused by buffer over-flow attacks, i.e., a large number of redundant or illegal requests that are received in a given time exceed the number that a server can handle causing a denial of service to legal requests or allowing the overflow requests to proceed unauthorized. In less preferable embodiments, other types of receiving means that are able to receive information from a network may be used. Upon reception of the request, a binary stream reader reads (step 210) the request from the server queue. An available internal entity, i.e., network session object that handles each message in its lifetime in the system, is allocated.

A protocol message constructor takes the received distrusted operation request which may be formatted to any type of protocol, and constructs, i.e., formats, (step 315) the distrusted request into a well-formatted internal message according to a desired protocol specification 320. Protocol specification 320 can be any type of application protocol used by a trusted application. This is also referred to as tunnel construction, where the operation request is embedded into the data format of the protocol of the trusted network and application. Desired protocol specification 320 can be any protocol, e.g., HTTP, HTTPs, SOAP, HTTPd, FTP, WebDAV, employed by the requested application(s).

Tunnel construction is implemented by encapsulating or wrapping the operation request from the received protocol in the protocol of the trusted application. This step avoids protocol restrictions. Construction of the operation request into a well-formatted internal message may result with a failure to format the stream, thereby, leading to an immediate total stream rejection. Failure can result from the inability to create a legal protocol message due to, for example, missing or extra parameters.

Upon successful formatting of the request into an internal message, the message is indexed (step 325) and stored to allow later analysis. This step allows information to be gathered from the request and accumulated, in a temporary buffer or permanent storage device, for later comparison to the corresponding reply returned from an application's execution of the request or to other operation requests and respective replies. If rejection does not occur, the message is translated (step 330) into a known encoding language that is understood by the pipe components. The known encoding language can be any type of encoding language.

In a preferred embodiment of the invention, the encoding language used is American Standard Code for Information Interchange ("ASCII"). ASCII is preferred when using a HTTP application protocol. In operation, each message is translated to ASCII characters which are known and expected by the system. Therefore, if a received request is encoded in Unicode, for example, or any other encoding standard, the message is translated into ASCII. The step of translating further provides an isolated and independent inspection of the operation request by determining if any symbols contained in the request are unexpected. In other words, any request that contains unexpected characters may be rejected in its entirety. The use of ASCII encoding, as the message base encoding type, is based on the HTTP standard in Request for Comments ("RFC") document number 2068. In an embodiment of the invention, any update of a protocol standard will lead to an immediate update in the supported message base encoding type.

The encoding reliability of the message is critical to the next stage. As mentioned, any failure in the constructing or translating steps can lead to an immediate total message reject. The step of translating insures that the remaining security process is performed on an expected encoding standard, thereby minimizing the risk of security compromises due to unexpected characters. Further, translation isolates the original message from the translated, i.e., converted, message to insure that all pipes will execute properly on the converted internal message.

Successful constructing, indexing, and translating steps converts a distrusted operation request into a well formatted protocol message in, for example, ASCII encoding. These steps act as a preliminary screening of the format of the request before the requests are passed along for intensive scrutiny of the contents by applying one or more pipes. Alternatively stated, the above steps filter out request that are blatantly surprising or unexpected before checking the requests' contents for concealed or not readably identifiable illegalities and harmfulness.

Following translation, the destination of the simple internal message is resolved (step 335) and compared to all known application paths. If the determined message destination is known, i.e., a match was found with a known application path, a destination tag is incorporated into the internal message, and the message is routed (step 340) through the appropriate tunnel, hence applying the relevant pipes specified, for that application path. If the destination can not be resolved, or does not match any known application path, the message is routed (step 345) through a default tunnel to a pre-defined default destination.

Upon successful identification of the destination of the distrusted message, one or more pipes are applied serially (steps 350-355) to the message to intensively scrutinize the message contents, e.g., instructions, commands, URI, query string, environmental variables, and parameters contained within the request, thereby, further insuring that the request is legal and harmless. These steps are depicted on the right side of FIG. 3. Each pipe provides a different type of specific security protection or monitoring functionality. The number of pipes is dependent on the amount of security deemed necessary, based on the type and needs of each tunnel and/or application path. For example, one tunnel may have three pipes applied, while another tunnel may only have two applied.

For safety precautions all available pipes are applied to the default tunnel. The default tunnel may further transmit any message that was found to have a security problem. The default destination may be any web error page, security alert page, or similar functioning way to alert that an error has occurred or to redirect a malicious attack away from the trusted application.

Pipes are generally categorized into static, dynamic, and learning types. Static pipes scrutinize the contents associated with the requested operation. Particularly, the contents of a distrusted request are compared to statically stored requests that are related to known vulnerabilities. If a match is found, the request is rejected, modified, or replaced. Dynamic pipes, however, scrutinize both the request and the corresponding reply, and the possibly changing, i.e., dynamic, relationship between them. Learning pipes apply techniques which gather information from the requests and replies to "fine tune" their scope of security. Specific pipes are described in the following pages.

Upon application of pipes (steps 350-360), the legality and harmfulness of the operation request will be determined. If the operation request is deemed to be legal and harmless, and sent (step 365) to the trusted application for execution (step 370). Once the application processes the request, a respective reply is generated for return to the requesting client. For example, the reply may be a html document, image, database information, file, or any other information accessible through an information server.

Referring to FIG. 4, the steps of method 300 that occur after the execution of the operation request are shown. This reply is read (step 405) and then constructed (step 410) into an internal message based on the specified application protocol 420. In a preferred embodiment of the invention, application protocol 420 is identical to application protocol 320.

If any of the pipes applied to the operation request required inspection of the return reply, the following steps are executed. The reply message is indexed (step 425) back to the original request if comparison between the two is necessary for any of the pipes implemented. Upon indexing the message, the reply message is translated to (step 430) the encoding language used previously by the pipes (step 330).

Outgoing replies are validated (step 435) using the translated indexed request stored previously and the translated and indexed reply messages. Particularly, this step insures that the outgoing reply is trivial in nature. For example, the reply contains only information that is authorized for release from the server and that is associated with the incoming request. Further, information gained from the reply is used to update any necessary dynamic or learning pipes (steps 440-445). Upon updating, the translated reply is reconstructed (step 450) into a message according to protocol 455, if necessary, and is sent to the client requesting the operation. In a preferred embodiment, protocol 455 is identical to protocol 320.

If the operation request did not have any pipes applied that require inspection of the reply, steps 425-450 are skipped.

Figure 5:
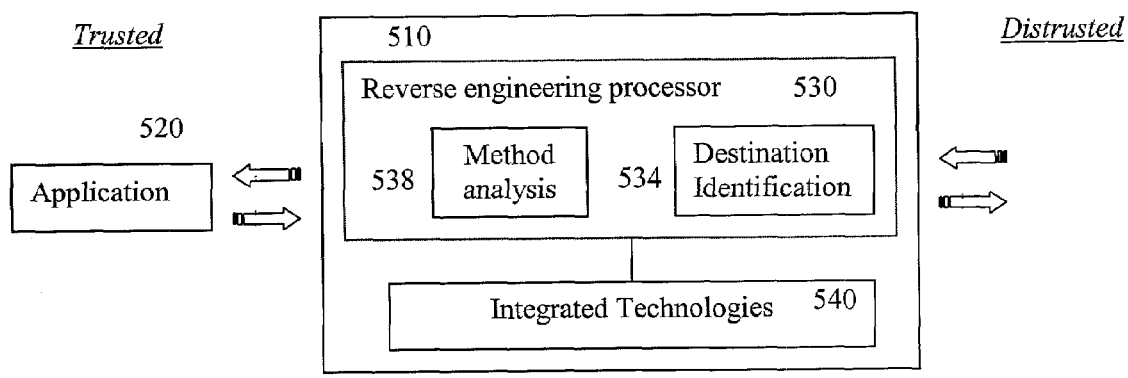
FIG. 5 illustrates an application layer security system according to an embodiment of the invention.

FIG. 5 illustrates a security tunnel system having a hardware configuration according to an embodiment of the invention. Particularly, security tunnel system 510 is positioned in between trusted computer application 520 and a distrusted network environment. Security system 510 employs an operation reverse engineering layer to prevent unauthorized use of application 520.

In an embodiment of the invention, security system 210 comprises reverse engineering processor 530 and pipes component 540. Reverse engineering processor performs initial tunnel construction, indexing, and translation as described above via internal entities that isolate the operation requests sent from the distrusted environment from the trusted application. The internal entities escort the distrusted requests to destination identification module 534 and method analysis module 538 for validation.

Destination identification module 534 applies every existing application node on the incoming request stream to identify the operation request's desired destination in the application, as well as the value of the parameters, if any. Pipes module 538 applies one or more pipes and learning techniques, stored in pipers component 540, to secure against known and unknown vulnerabilities, buffer overflow vulnerabilities, poisoning attacks, database manipulations, or any other type of illegal or harmful request.

Pipe Descriptions

The following represents a detailed description of the specific pipes which may be applied alone, or in combination, to incoming operation requests.

1. Marabu

In an embodiment of the invention, a first pipe, herein referred to as "Marabu," is applied to one or more application paths. Marabu is a driven pipe aimed at finding patterns that show malicious intentions in an operation request. Marabu is preferably applied to application paths involving database operations. Particularly, Marabu inspects an incoming request's contents for permitted syntax based on the type of database used and the existence of one or more embedded harmful SQL commands. Harmful commands are determined by the failure to find a match to a plurality of stored database commands deemed acceptable for the type of requested database, e.g., SQL type databases or Oracle type databases. If a match to a legal command is not found, the request will be rejected or reengineered, i.e., modified, into or replaced with an acceptable form that is legal and harmless. This pipe catches well-formed and partial SQL commands that are deemed to be harmful to the application environment.

In an embodiment of the invention, a database query parser engine is implemented to identify the form and function of each expression of the operation request. The parser engine parses out individual expressions, i.e., elements, for separate analysis. As it is impossible to define all malicious inputs, Marabu focuses on insuring that the syntax of each expression is straightforward and credulous. This type of syntax is enforced by applying a 'state-automate' and limited alphabet.

In an embodiment of the invention, Marabu employs a method to enforce proper syntax comprising the steps of: building a state-automate; inspecting each and every expression according to permitted syntax and a limited alphabet, and applying the state-automate. Particularly, a state-automate is a correlation of nodes representing present and other possible states of the application. Each node may have connections to other nodes based on conditions that would change the state of the application. For example, a first node representing a present state of the application is connected to another node representing a possible state reached from the present state when a certain condition occurs, e.g., a DELETE command is found. All connections are one-way connections, i.e., once a state changes to another state, that change is irreversible. The alphabet contains: letters, digits, and other encoded characters, for example: a, b, c, _, ', etc.; blocks of letters, such as DELETE or ALTER; and groups of blocks, such as an SQL group comprising DELETE, ALTER and CREATE as members.

Each expression within an operation request is scanned one or more times. If the expression consists of a sequence of letters and digits, the expression is approved and pipe execution stops. If the expression does not consist of letters and digits, the remarks, i.e., the database specific character that represents a remark, such as MSSQL - /* */ or --, inside the expression is omitted and the expression is inspected by applying the automate. Particularly, every predefined alphabet letter associated with an expression or a function argument moves the current state of the automate to a connecting possible state. The states automate algorithm is designed to eliminate unnecessary checking and to increase the pipe's processing speed by implementing best practice information of executed SQL commands.

If the automate reached a Boolean-state, check if the expression is always true using expression trees. For example, the expressions '15'='1'+'5' or '6>5 OR 5=5'' are always true. To validate if an expression is always true the expression is recursively broken into a tree having nodes as operators, e.g., AND, OR, =, and the like; or variables such as a field. After the tree is built, different values are inserted. A post-order scan will eventually give a TRUE or FALSE value. Wisely sampling values to the variables will cover the range of all possible solutions, thereby answering if the expression is always true.

If the automate reached a SQL-state, validate the expression using SQL prototypes stored in a dictionary. The prototypes are implemented using a graph of different states connect by arcs. The two-way-arcs will allow recursive expressions, i.e., states with arcs pointing to themselves, and 'stretching' in order to try to fit the input.

If the automate reaches a Trap-state, the expression is denied and execution of the pipe is halted. If none of these states occur or inspection of the above states does not result in denial of the expression, the expression is approved and pipe execution stops.

Figure 6:
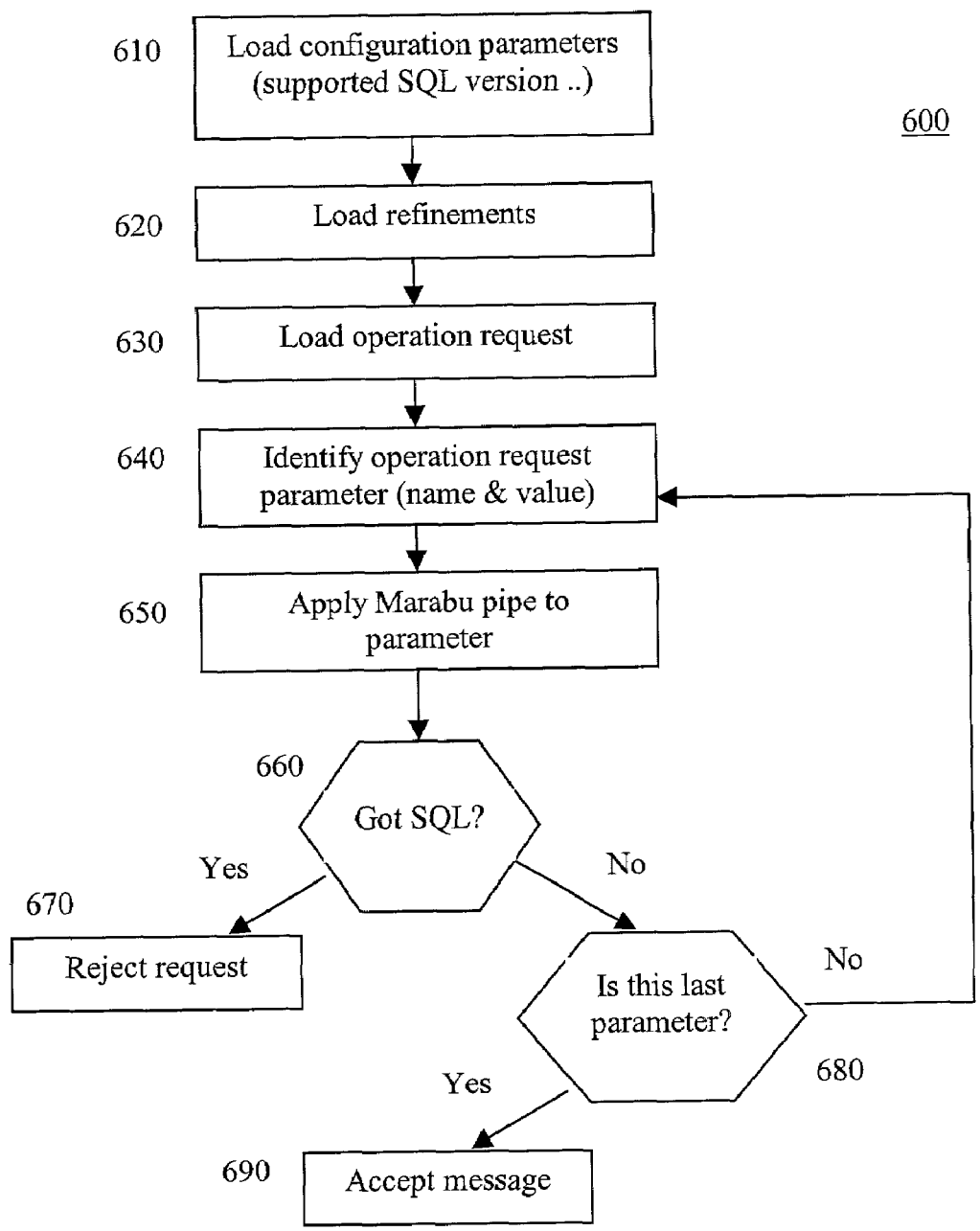
FIG. 6 illustrates a first pipe process according to an embodiment of the invention.

FIG. 6 illustrates process 600 for implementing the Marabu pipe according to an embodiment of the invention. Configuration parameters for the supported database, e.g., SQL version, are loaded (step 610) into a reverse engineering processor. Refinements are loaded (step 620). The operation request is then loaded (step 630) and parsed into elements to identify (step 640) an operation request parameter or expression. Marabu is applied (step 650) to the parameter to determine (step 660) if the element is illegal or harmful. If illegal, the entire operation request is rejected (step 670). If not, it is determined (step 680) whether or not the parameter is the last parameter. If the parameter is not the last parameter, steps 640-680 are repeated. If the parameter is the last parameter, and no illegal or harmful elements are identified, the operation request is accepted (step 690) and allowed to proceed.

The following are two common types of database attacks that are wide spread across the internet that are typical of manipulation types that are caught by this pipe. The first represents a request to delete all records in a table. The second represents a request to login to a database without using a password.

For example, in the delete all records attack, an original link, such as http://www.yoursite.com/phones/phonelist.cgi?phoneid=34 which executes a SQL command on a database server to select and report the contents of "http://www.yoursite.com/phones" where "phoneid" equals 34, may be changed into a modified link concatenating a DELETE command, such as http://www.yoursite.com/phones/phonelist.cgi?phoneid=34;DELETE The latter executes a SQL command on the database to delete the contents of "http://www.yoursite.com/phones" where "phoneid" equals 34. In applying this pipe, the DELETE command is recognized as an unauthorized command and hence, may either reject the request entirely or replace the request with a legal request such as the original link.

In a second type of illegal request, login is attempted without using a password. For example, an original link, such as http://www.yoursite.com/logon.asp?login=yourname; pws=123 executes a SQL command on the database server to select a name from a user list where login='yourname' and the password='123'. A modified link adds an 'always true' Boolean phrase, for example http://www.yoursite.com/logon.asp?login=yourname' or '1'='1'; pws=8 executed a SQL command on the database server to select a name from a user list where login='yourname' or '1'='1' and the password='123'. When applying this pipe, the '1'='1' partial command is recognized as invalid and the request is not allowed to achieve its intended execution.

Full database protection is provided against users and client applications manipulating an application database. Particularly, the Marabu pipe acts as a shield against data manipulation that can damage information stored within the database. Further, it provides database system administrators with an additional level of protection when combined with other pipes and it insures that application bugs will not effect a back office database.

2. Minime

In an embodiment of the invention, a second pipe, herein referred to as "Minime," is applied to one or more application paths. Minime is a deterministic type pipe that inspects an incoming operation request for known vulnerability patterns. In an embodiment of the invention, all known application vulnerabilities, and the respective requests that take advantage thereof, are stored and compared to the incoming request. If the comparison results in a match, the incoming request is blocked and is not allowed to proceed to the application. Further, the pipe may shield applications against unknown vulnerabilities by eliminating the use of executables, methods, and scripts, e.g., format.exe which formats a storage space or cmd.exe which enables a command-line input prompt, that if accessed or executed, could negatively affect or allow illegal access to the application environment or servers.

In a preferred embodiment of the invention, the stored vulnerability information may be updated as future vulnerabilities are found. Particularly, the stored information may be updated with information downloaded from an information source, for example, a dedicated centralized server or multiple web servers from commercial or government sources. For example, a current data file includes over 350 patterns grouped by server types and locations.

In an embodiment of the invention, the Minime pipe employs an exact pattern matching method. Particularly, the method comprises the steps of: computing a hash value for every four (4) consecutive characters in an operation request and comparing each computed has value against a list of patterns known to be associated with illegal or harmful requests. For example, the first four characters of an operation request is inputted into a four (4) character window. Each of the four characters is converted to an 8 bit binary code, for example:

$$abcd=[01000001][01000010][01000011][01000100]$$

A first hash value is then calculated from the 32 bit string (4 characters×8 bits/character). A second hash value is calculated by shifting the window one (1) character, i.e., characters 2 through 5. A third hash value is calculated by shifting the window again by one character, i.e., using characters 3 through 6. Additional hash values are calculated in such a way until all the characters in the operation request have been exhausted. Thus, if there are n characters in an operation request, n-3 has values will be calculated.

Every pattern has the following structure:

{text, Left Hash Value, Right Hash Value, Right Offset, Gap Between Left and Right}

The Left and Right Hash values are calculated from the 4 character sub-string taken from the pattern. "Right Offset" is the position of the right sub-string. The "Gap Between Left and Right" is the offset between the two patterns.

A Table (Bit Map) in the length of the number of values to match is built. Every index in the table represents hash Modulu of the number. The structure of every index is as follows:

{Is Occupied, Number Of Patterns, Patterns List}

"Is Occupied" indicates if the certain index represent the hash value (modulu . . . ) of one of the patterns. "Number Of Patterns" is the number of patterns having this index to represent them (should be a very small number). "Pattern List" is an array containing the patterns.

While sliding on the text (and easily updating the hash value by shift and or), this pipes determines if the hash value is represented in the table (IsOccupied is on). If so, the list of patterns is analyzed and attached (PatternList, NumOfPatterns). Check an array containing last match index (−1 at the start). If the GAP between the two indexes is different then the gap between the two patterns, the last match index is updated. Otherwise, the pattern is suspected to appear in the text, i.e., the two patterns are in the exact gap between them as expected.

In a preferred embodiment of the invention, the above method is applied to an operation request constructed in HTTP protocol. The operation request is divided into 4 scanning zones based on: (1) the message URI; (2) Query string; (3) message headers; and (4) message body. Each pattern is directed to a specific zone or zones. Therefore performance is increased while false alarms are decreased. If a string is determined to be a suspect, full simple string matching is performed.

Figure 7:
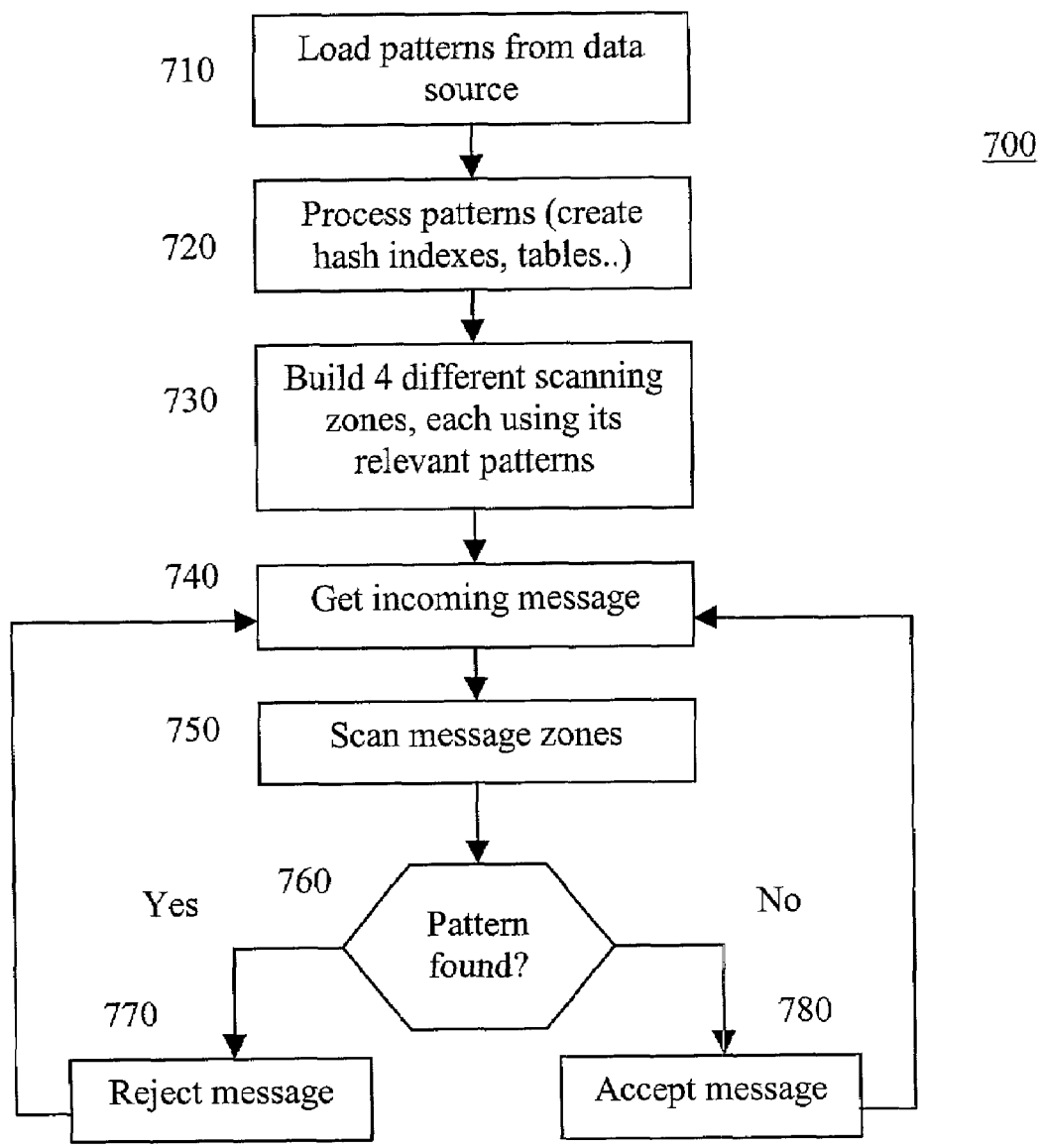
FIG. 7 illustrates a second pipe process according to an embodiment of the invention.

FIG. 7 illustrates process 700 for implementing the Minime pipe according to an embodiment of the invention. Known vulnerability patterns are loaded (step 710) into a reverse engineering processor. These patterns are processed (step 720) into hash indexes and tables. Four different scanning zones are built (step 730), each using its relevant patterns. The incoming message is loaded (step 740). Message zones are scanned (step 750) to determine (step 760) if a vulnerability pattern matches. If a pattern is found, the message is rejected (step 770). If a pattern is not found, accept (step 780) the message. For any subsequent operation request, steps 740-780 are reapplied.

The following are three common Microsoft Internet Information Server (Version 4) vulnerabilities that this pipe blocks: (1) view any file on your web server hard disk, http://www.yoursite.com/msadc/Samples/SELECTOR/showcode.asp?source=/msadc/Samples/../../../../boot.ini (2) use this page to execute any SQL command directly to your database, http://www.yoursite.com/msadc/samples/adctest.asp (3) using CodeBrws.asp, it is possible to view Outlook mail folders:

http://www.yoursite.com/iissamples/exair/howitworks/codebrws.asp?source=/../../winnt/Profiles/Administrator/Application%20Data/Microsoft/Outlook%20Express/Mail/inbox.mbx The Minime pipe provides the following benefits: it protects applications from remote users attempting to hack a system using application vulnerabilities; it provides IT administrators with an immediate protection to their applications until a patch is available and installed on the production server; it provides a second layer of protection against unknown vulnerabilities; it allows IT administrators to add custom patterns and to remove existing patterns from the data file.

3. Hide & Seek

In an embodiment of the invention, a third pipe, herein referred to as "Hide & Seek," is applied to one or more application paths. Hide & Seek is a HTML/WML/XML driven pipe whose purpose is to insure that an application operates as designed and implemented by the application owner. Particularly, the pipe checks each outgoing HTML/WML/XML reply for its internal URLs and parameters values, then validates the next user request to match one of the stored URLs and parameters. This method insures that subsequent user requests to the application are only those that the application previously allowed.

This pipe implements a method that comprises the following steps: identify a single client to interact with the application; determine the parameter names and values that the client received from the application; and check if a client request to the application includes any parameter, if so, check its value. Only if the value sent by the client is equal to the value that the client received from the application, will the request be forwarded to the application.

In order to identify a client in a state-less protocol, i.e., a protocol that is only concerned with the source and destination but not the contents of the message, the pipe utilizes a session-based cookie. In order to identify the application reply, an on-line parser reads each reply coming from the application and searches for specific HTML/WML/XML elements in the reply document. For each HTML/WML/XML element, e.g., input, select, form, etc., the parser determines the element value. All parsed values are stored in a session object running in the server, wherein each session is related to a single client.

After identifying the client and attaching to the request the session object, an additional parser operates on the request. At this stage, a comparator is used to match the request with the reply based on the HTML/WML/XML specification. Based on the HTML/WML/XML element type, the reply parser can determine if the parameter name can be changed by the client on his next request. If so, it permits a client to send any value with this parameter. For example, if the application reply includes an <INPUT> html tag, the parser expects the client to enter a value. Thus, the client's request is not checked for an exact match. To insure HTML elements like the <INPUT> element and others will not allow any value to be submitted to the application. The pipe uses a refinement file to declare the type of parameters that the pipe will check, e.g., integer, long, string. The pipe may further compose application session tracking information. Caching techniques also may be integrated.

In a particular embodiment of invention, the following algorithm performs HTML/WML/XML parsing on a reply document and generates a knowledge 'basket' of all HTML/WML/XML tags that are sent by the user on a next subsequent request. The algorithm also validates the next request to exactly match its knowledge 'basket' content.

A HTML/WML/XML parser that is used that will support the latest HTML/WML/XML version. The parser receives a reply HTML/WML/XML document (the document going from the web server to the client), parses it based on a specified HTML/WML/XML Request For Comments ("RFC") document and will fills the knowledge 'basket' with all HTML/WML/XML tags that, based on the HTML/WML/XML RFC, can be sent back to the server on a user's next request. Examples of supported HTML tags are, but not limited to, <FORM>, <INPUT>, <SELECT>, <TEXTAREA>, <A>, and <IMAGE>.

In order to identify a single user in a stateless protocol environment, the Hide & Seek pipe uses a cookie mechanism. Cookies must be enabled on a client's web browser. If cookies are not enabled by the client, the Hide & Seek pipe can not store information in the knowledge 'basket.' For security purposes, a client without cookies enabled is considered as a 'new' or unauthorized user who is limited to minimal application activities.

The following is a simple example of a Hide & Seek implementation. A typical HTML document for login and password is:

```
<HTML><BODY BGCOLOR="#FFFFFF">
    <FORM name="faq" method=POST action="login.asp">
        <BR><BR><BR><BR><CENTER><TABLE><TR>
            <TD>Login: </TD>
            <TD>Password: </TD>
        </TR><TR>
            <TD><INPUT TYPE="text" NAME="Login"></TD>
            <TD><INPUT TYPE="password" NAME="password"></TD>
            <TD> <INPUT TYPE="hidden" NAME="state" value=0></TD>
        </TR></TABLE><BR><BR>
        <INPUT TYPE="submit" name="Submit">
    </CENTER></FORM>
    <FORM name="remember" method=POST action="remember.asp">
        <BR><BR><BR><BR><CENTER><TABLE><TR>
```

-continued

```
            <TD>Login: </TD></TR><TR>
<TD><INPUT TYPE="text" NAME="RememberPWS"></TD>
<TD> <INPUT TYPE="hidden" NAME="state" value=2></TD>
            </TR></TABLE><BR><BR>
      <INPUT TYPE="submit" name="Submit"></CENTER>
         <A HREF="/Terms.asp?x=1&y=3">Terms</A>
                </FORM></BODY></HTML>
```

Upon parsing, the results are stored in the knowledge 'basket' having a template:
[Group]=1
Login=[text]
Password=[text]
State=0
Submit=[text, not a must]
[Group]=2
RememberPWS=[text]
State=2
Submit=[text, not a must]
[Group]=3
X=1
Y=3

When the user clicks on a submit button, a new request will be sent to the server. The Hide&Seek will, then: check for the cookie ID sent by the user to get the relevant knowledge 'basket;' and validate the parameter names, values, and combinations to match one of the groups stored in the knowledge 'basket.' Upon finding a match, the user did not manipulate the parameters (legal messages). If not matched, the user manipulated the request, (illegal message). Each parameter value is analyzed to determine that it does not include valid HTML/WML/XML tags that later can be parsed by the Hide&Seek, thereby, eliminating cross-site scripting security threats.

In order for the Hide&Seek to handle [text] fields, e.g., a user typing his login, a refinement declaration table is used. The table includes each parameter and its expected data type, length, allow null, etc It is important to note that the Hide&Seek is a parameter-oriented algorithm that validates types, values, and combinations of parameters. In other words, the pipe creates a dynamic policy on the reply, and then applies this policy on the user's next request.

Figure 8:
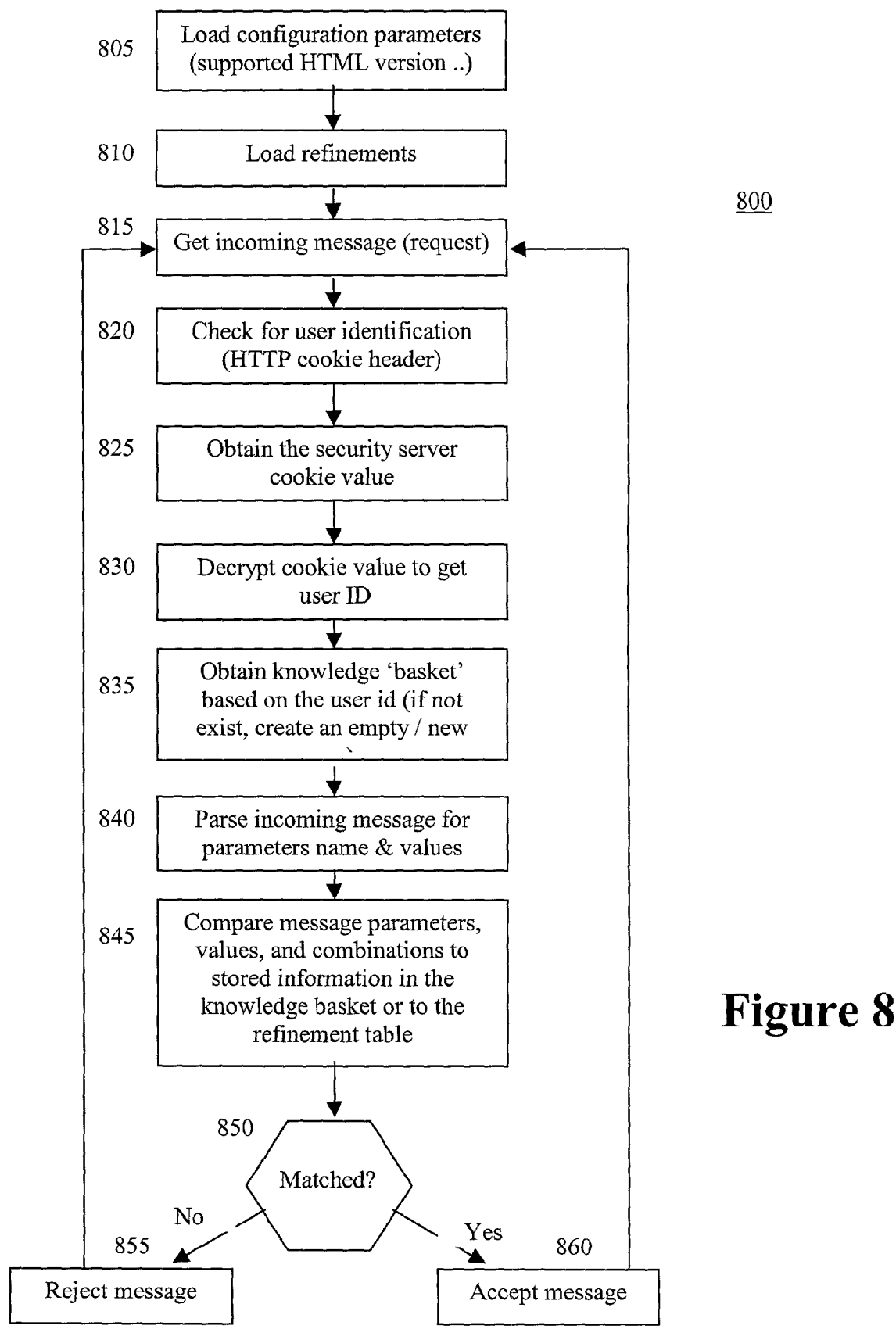
FIGS. 8 and 9 illustrate a third pipe process according to an embodiment of the invention.

FIG. 8 illustrates process 800 for implementing the Hide&Seek pipe according to an embodiment of the invention. Configuration parameters are loaded (step 805) based on the supported HTML version. Refinements are then loaded (step 810). An incoming operation request message is loaded (step 815) for analysis and then checked (step 820) for user identification in a HTTP cookie header. Subsequently, the security server cookie value is obtained (step 825) and decrypted (step 830) to get the user ID. The knowledge 'basket' based on the user ID is obtained (step 835). If it doesn't exist, a blank or new one is created. Then, the incoming message is parsed (step 840) into parameters name and values. Message parameters, values, and combinations are compared (step 845) to stored information in the knowledge basket or to the refinement table. An existence of a match is then determined (step 850). Based on the result of the determination, reject (step 855) or accept (step 860) the message and apply steps 815-860 to the next incoming message request.

Figure 9:
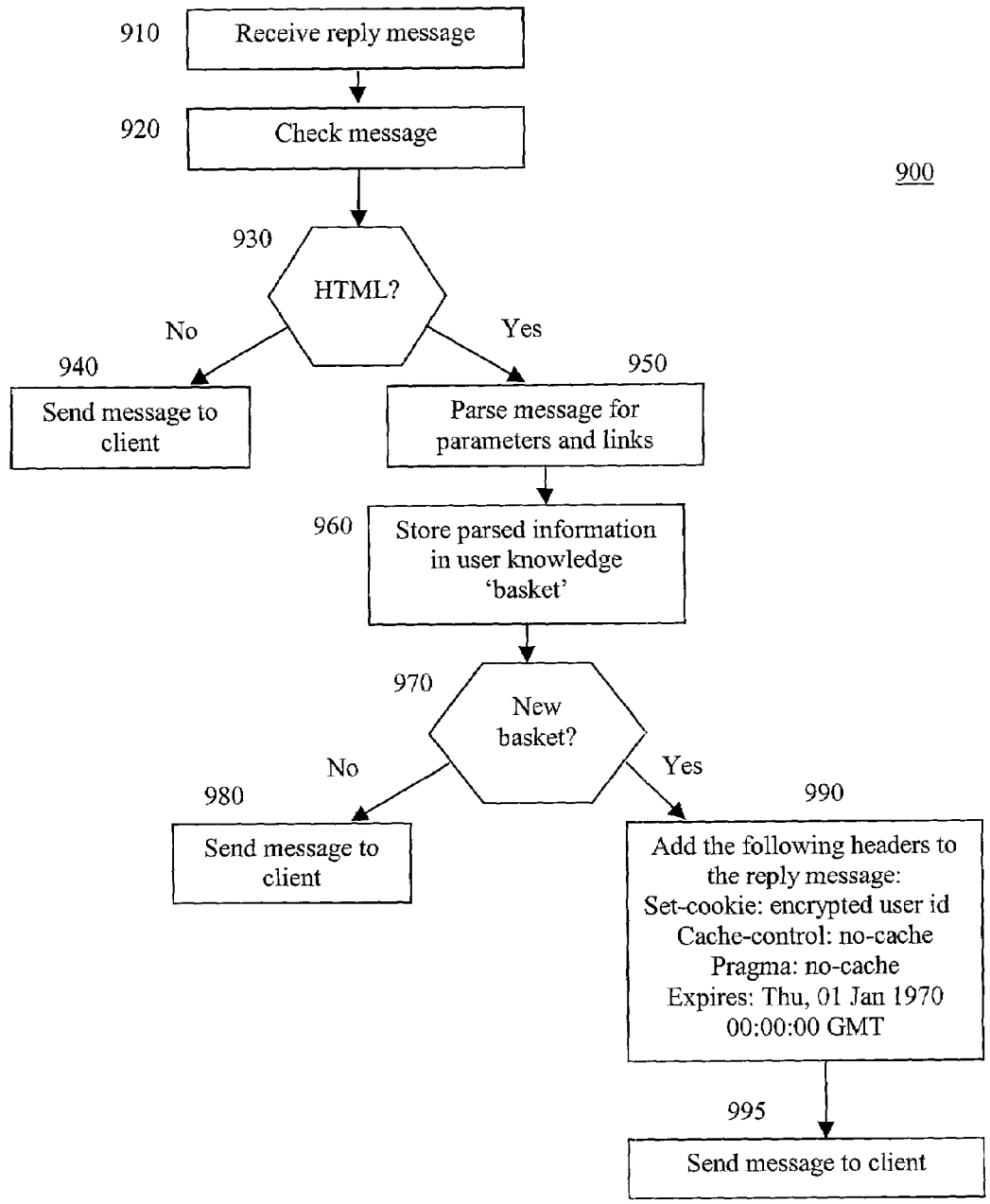

FIG. 9 illustrates process 900 for implementing the Hide&Seek pipe on a reply message according to an embodiment of the invention. First, a reply message is received (step 910) and loaded (step 920) to determine (step 930) if the reply is an HTML document. If not HTML, the reply message is sent (step 940) to the client. If HTML, the reply message is parsed (step 950) into parameters and links. All parsed information is stored (step 960) in a user knowledge 'basket.' The basket is determined (step 970) on whether or not it is a new basket. If not a new basket, the message is sent (step 980) to the client. If the basket is new, a header is added (step 990) to the reply message and then the entire message is sent (step 995) to the client.

Hide&Seek protects applications from remote users manipulating an application business process. Further, it protects the application from any URL requests manipulation techniques and provides application owners with an immediate and continuous shielding.

4. Inigo

In an embodiment of the invention, a fourth pipe, herein referred to as "Inigo," is applied to one or more application paths. Inigo is an application-node blocking pipe whose purpose is to restrict remote user requests from entering application nodes that are designated as restricted by an application owner. In a production environment where business applications are running, application owners are facing an administrative problem when a bug was found in one of the application nodes. For example, stopping an application from executing may affect one or more business processes the application implements. Therefore, application owners may sometimes keep applications running, even though a vulnerability is known within the application, until a production patch is available. Using the Inigo pipe, application owners can block a vulnerable application-node from being accessed while keeping other applications available to users.

Figure 10:
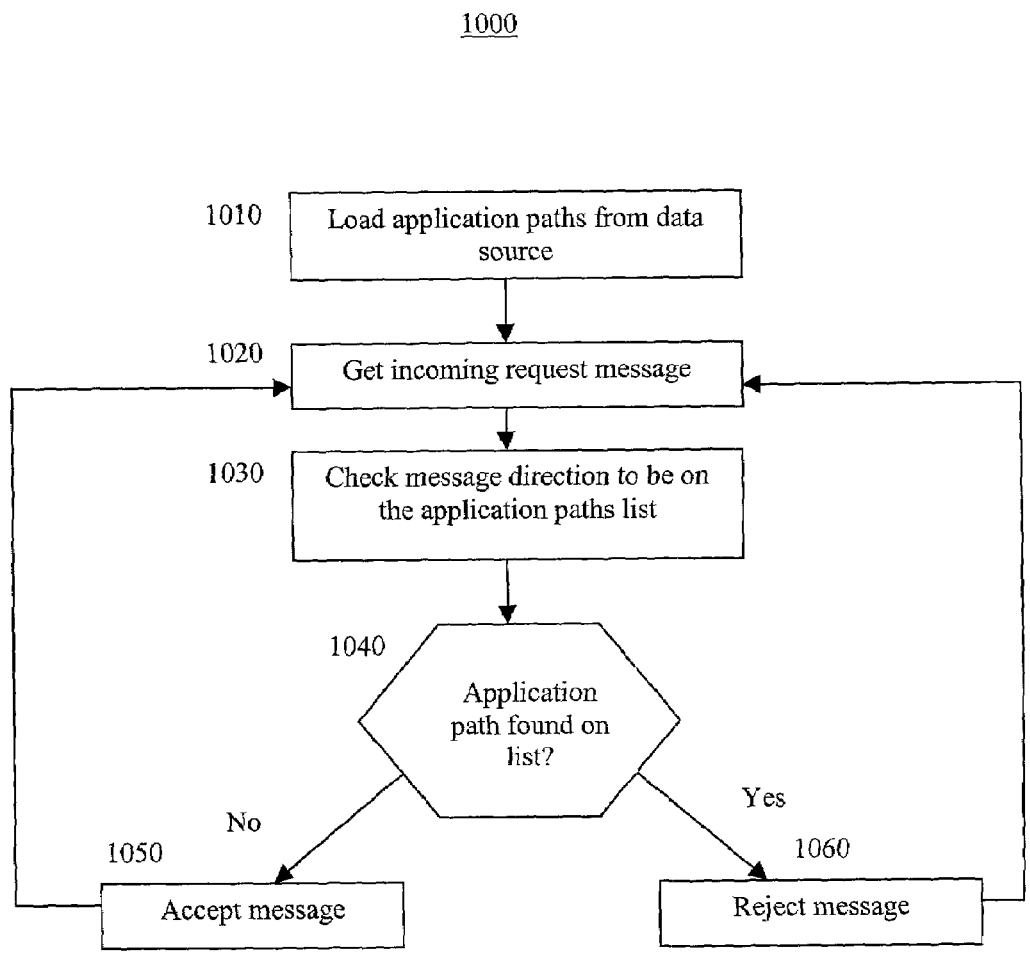
FIG. 10 illustrates a fourth pipe process according to an embodiment of the invention.

FIG. 10 illustrates process 1000 for implementing the Inigo pipe according to an embodiment of the invention. Application paths are loaded (step 1010) from a data source. An incoming request message is loaded (step 1020). The destination of the message is then determined (step 1030) and compared (step 1040) against blocked application paths. If a match is found, the message is rejected (step 1060). If not found, the message is accepted (step 1050).

For example, to block a press release directory from browsing, due to incorrect published information on a link:
   http://www.yoursite.com/mysite/press/news.asp-
      ?newsid=23 is blocked and users will be redirected to the following default page when requesting the press release, such as
   http://www.yoursite.com/mysite/default.html The Inigo pipe provides application owners with immediate traffic blocking capabilities without waiting for production pipes to be implemented on all servers, and eases the complexity of administrating a single or large amount of applications when a vulnerability is found.

5. Ogini

In an embodiment of the invention, a fifth pipe, herein referred to as "Ogini," is applied to one or more application paths. Ogini is a pipe that blocks distrusted operation requests from being forward to a trusted environment or zone within a trusted network. By implementing this pipe, an administrator can restrict a remote user's specific messages to only those which are designated as allowed.

A pre-defined list of allowed messages is implemented. If a user's request message is determined to be one existing on the list, the operation request will be accepted. Otherwise, the operation request is rejected.

To provide administrators with an easy way to update the allowed message list, the pipe supports a learn state, where all incoming request messages determined to be acceptable are stored in a memory for later comparison to incoming requests.

Figure 11:
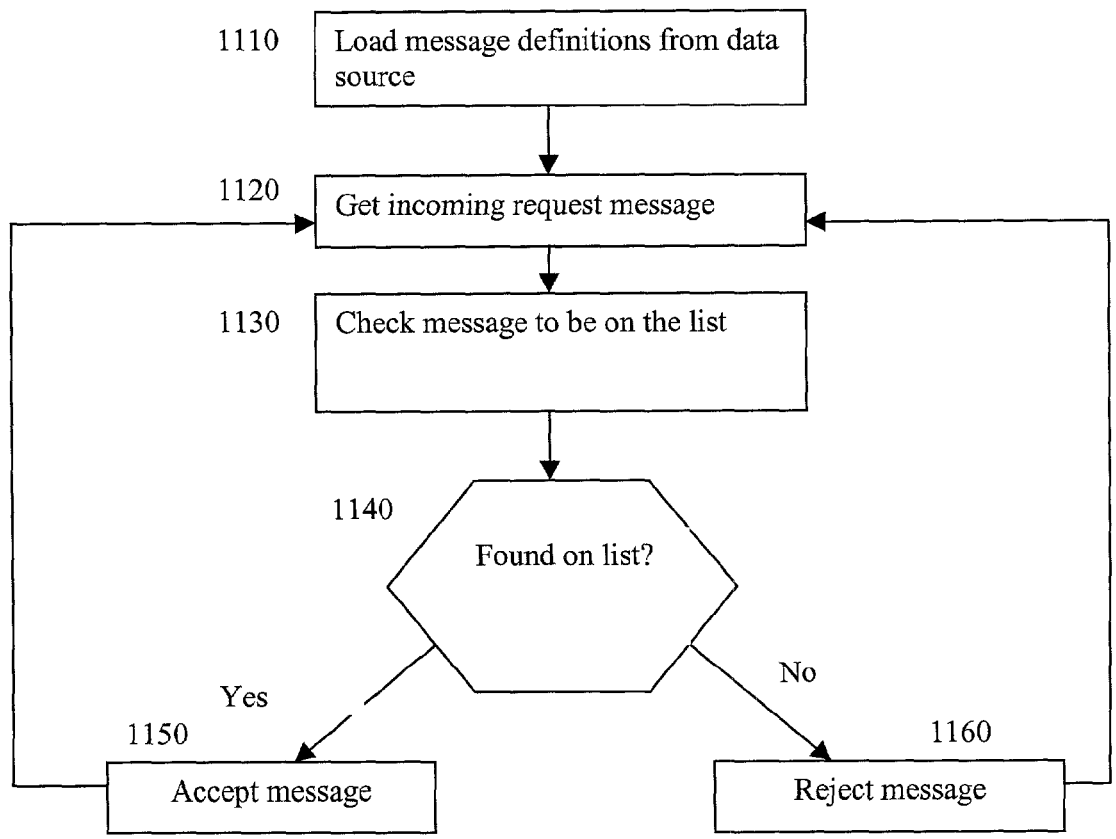
FIG. 11 illustrates a fifth pipe process according to an embodiment of the invention.

FIG. 11 illustrates process 1100 for implementing the Ogini pipe. Particularly, a list of acceptable operation requests is loaded (step 1110) into a processing means. The incoming message is received (step 1120) and compared to the list (step 1130) to determine (step 1140) if a match exists. Based on the determination, the operation request is accepted (step 1150) or rejected (step 1160).

6. Miloba

In an embodiment of the invention, a sixth pipe, herein referred to as "Miloba," is applied to one or more application paths. Miloba is a pipe that validates an incoming parameter value according to pre-defined expression rules. For example, in an online bookstore, customers may be allowed to order 1-5 books in each order. The bookstore uses an order_qty parameter to represent the number of ordered books. Miloba verifies that the user order_qty parameter value will match an integer data type with a value between 1-5.

In an embodiment of the invention, in order to identify and construct the pre-defined expression rules for each parameter, learning techniques are implemented in a continuous process to identify new acceptable parameters within an operation request by updating the pre-defined rules based on previously submitted operation requests.

Figure 12:
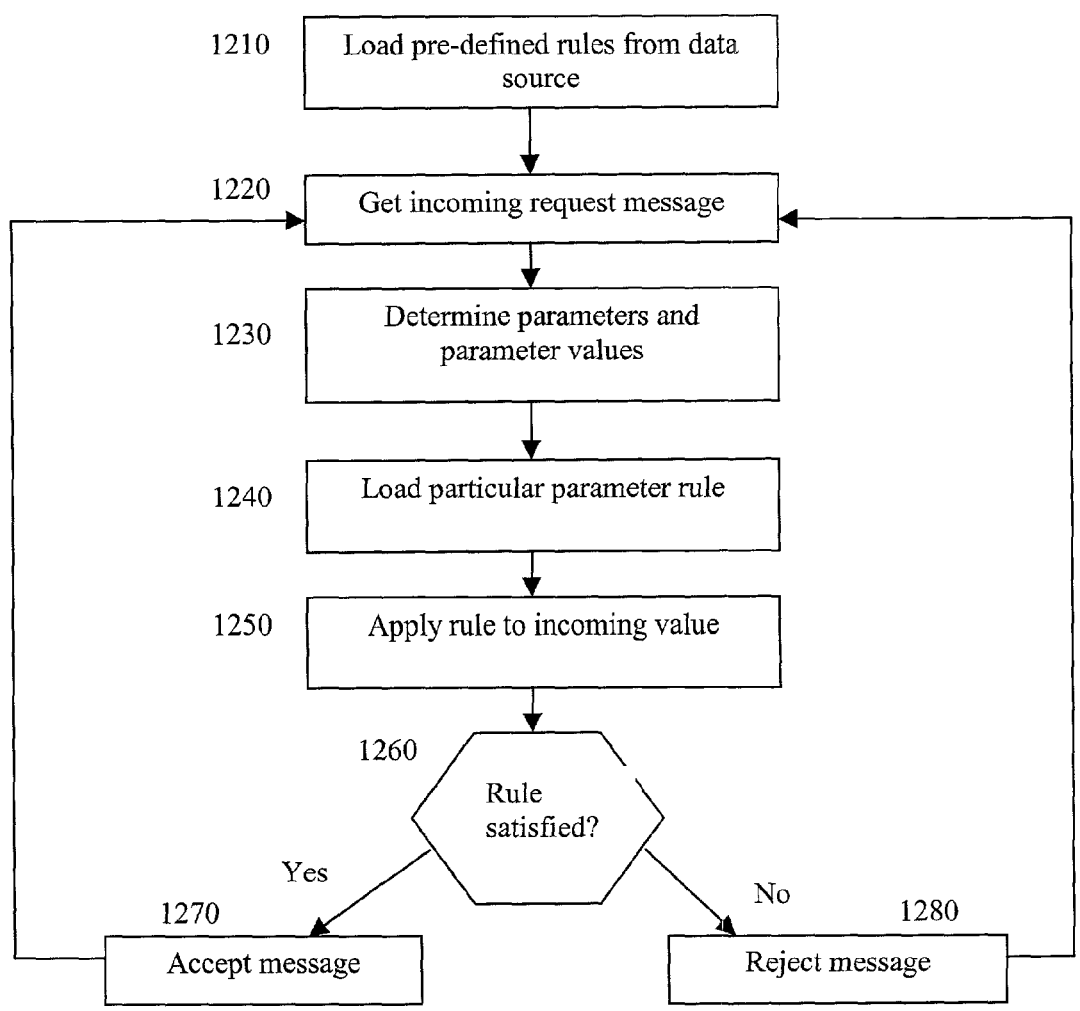
FIG. 12 illustrates a sixth pipe process according to an embodiment of the invention.

FIG. 12 illustrates process 1200 for implementing the Miloba pipe according to an embodiment of the invention. Pre-defined expression rules are loaded (step 1210) from a data source. An incoming operation request is loaded (step 1220) into a processing means. Parameter values in the operation request are determined (step 1230). Pre-defined parameter value rules are loaded (step 1240) and then applied (step 1250) to the incoming value. Accordingly, it is determined (step 1260) whether the rule is satisfied. Based on the determination, the parameter value is accepted (step 1270) or rejected (step 1280).

7. Cookie

In an embodiment of the invention, a seventh pipe, herein referred to as "Cookie," is applied to one or more application paths. This pipe protects client side (session based or persisted) cookies from being modified or manipulated by the user. The pipe insures that internal information stored in the cookie will not be available to the user but will transparently be clear to the application without applying any change to the application itself. Further, a security server installation topology in front of the application is used to encrypt and decrypt any HTTP header that includes a cookie value. Any type of encryption method can be employed.

Figure 13:
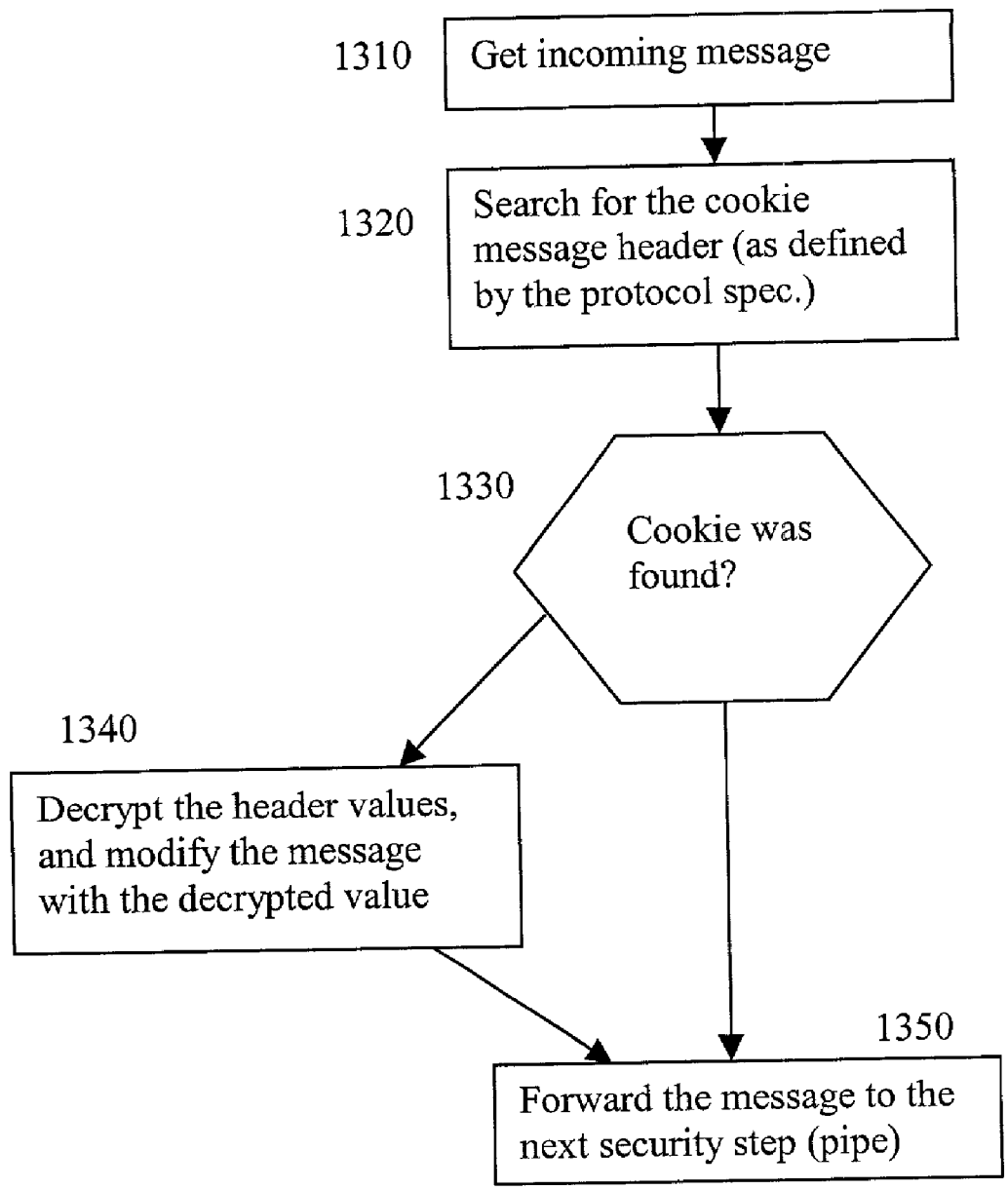
FIGS. 13 and 14 illustrate an eighth pipe process according to an embodiment of the invention.

FIG. 13 illustrates process 1300 for implementing the Cookie pipe on an incoming operation request according to an embodiment of the invention. An incoming operation request is loaded into (step 1310) any type of processing means. The pipe then searches (step 1320) for the cookie message header as defined by a protocol specification. Then, the pipe determines (step 1330) if a cookie is found, and if found, the operation request is modified to reflect the decrypted value and then forwarded (step 1350) to the next security pipe. If a cookie is not found, the step 1340 is not performed.

Figure 14:
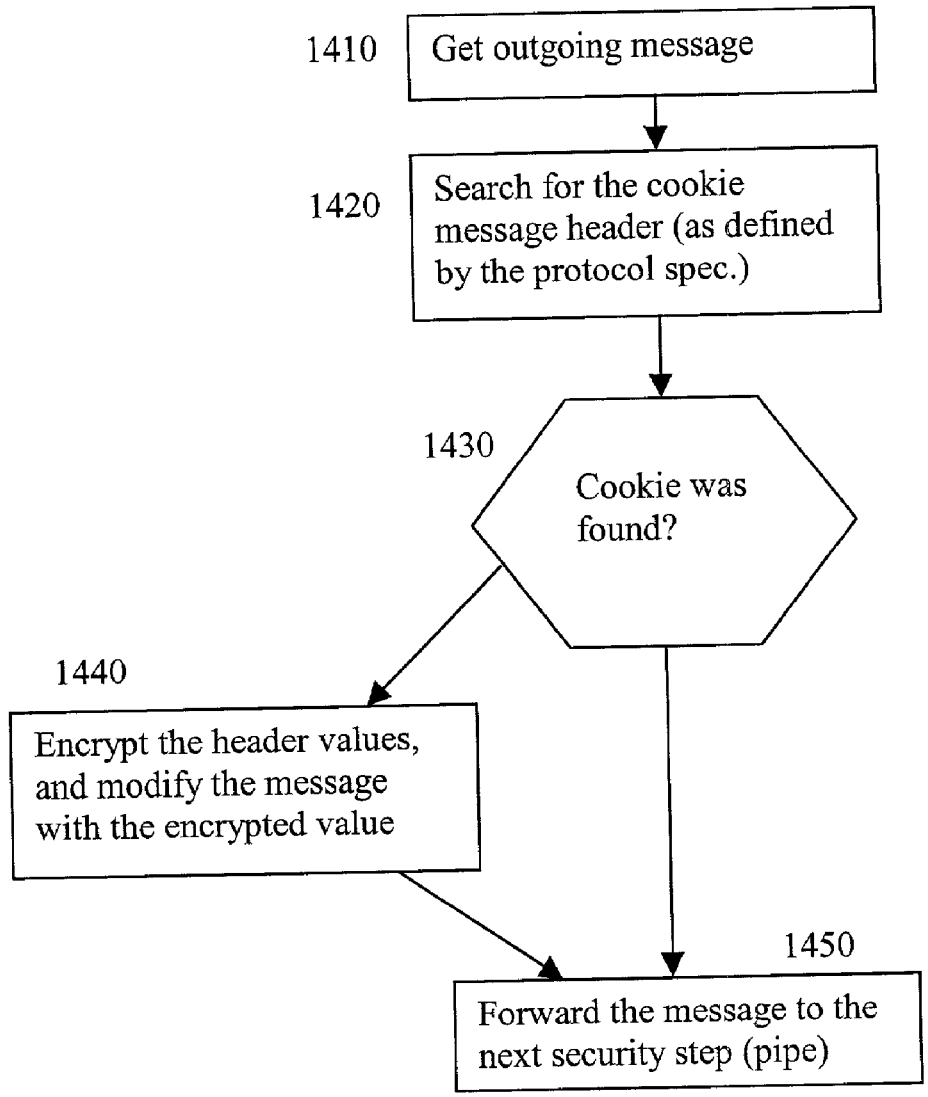

FIG. 14 illustrates process 1400 for implementing the Cookie pipe on a reply message according to an embodiment of the invention. The reply is loaded (step 1410) and scanned (step 1420) for a cookie message header as defined by the protocol specification. If a cookie was found (step 1430) the header values are encrypted (step 1440). The reply is then subsequently modified to reflect the decrypted value. The message is then forwarded (step 1450) to the next security pipe.

8. Learning

In an embodiment of the invention, a learning pipe is applied to one or more application paths. The application of a learning technique allows the parameters in a request to be "fine tuned" to better match the most common values entered by the clients, i.e., requestors, determined from a statistical model. Particularly, all operation requests to each application node are gathered and stored into a virtual directory. A dynamic range of entered values is then built for each parameter in a request that a client sends. Based on the statistical mode implemented, a range of probable, i.e., most often entered or expected values is computed. Further, the values of the parameters may be adjusted based on the reply from the application.

For example, consider a database operation request that it is requesting that the contents of a stored field "F" be reported back to the requester. A specified statistical model determined that ninety (90) percent of the requests ask for a particular F within the range of nine (9) to eighteen (18). Further, it is desired to limit F to within this range. In this example, any F value between 9 and 18 will be allowed to pass to the application and executed, however, a F value of twenty (20) will either be rejected totally, or adjusted to another value, such as the closest acceptable value, e.g., 18.

This technique is referred to as a learning technique because of it's ability to adjust or "learn" from the information accumulated from the parameter values requested over time. In other words, although the statistical model may not change, the range of the most common values dynamically changes with the values "learned" from numerous request operations. For example, the boundaries of the most common values may change as more and more values are received that are outside the original range of common values.

The learning techniques aim to provide another method to stronger the application-layer protection. The learning operation can be applied on each web application separately or on all available tunnels.

In an embodiment of the invention, a web application has two mode of operation, i.e., a learn mode or an enabled mode. In the learn mode the web application employs a method to collect all security errors determined by other pipes. For each error record the operation request's properties, such as, web application, tunnel, application path, and requested application; the operation message parameters; and the pipe that determined this security event. A refinement recommendation record for the relevant pipe is created and sent to the relevant pipe. Note: a refinement recommendation record comprises configuration information that the learning technique provides to the system administrator for application to each pipe.

In an enabled mode of operation, for each incoming operation request, the web application determines if the operation request is an approved message by comparison to a list of approved messages contained in storage. If approved, the operation request is deemed to be trusted. If not, the operation request is passed along for additional pipe inspection. Approved message requests are further inspected within the learning pipe. For each incoming request, the operation request is compared to a list of messages contained within a cache. If a comparison exists, the operation request is rejected. If it doesn't exist, the cache is update with the operation request, and each parameter related to all regular expressions.

In order to identify each parameter related regular expression, the learning technique uses a statistical normal distribution that accumulates each parameter value. Based on the current variance, the algorithm refines the current parameter regular expression validation. For example, operation requests include a price parameter, such as:

| Step | Parameter value | Regular expression |
|------|-----------------|--------------------|
| 1    | Price = 12$     | Long [0-1e6], [a-z], [./'@$] |
| 2    | Price = 15      | Int [0-100], [/@$] |
| 3    | Price = 34$     | Int[5-50], [$]     |
| 4    | Price = 25.5$   | Long[5-50], [.$]   |
| X    | Price = 22.2$   | Long[10-30][.$]    |

The x step, represents the final regulation expression, the learning techniques has. A final stage is reached when the distribution variance of the parameter regulation expression is low.

Figure 15A:
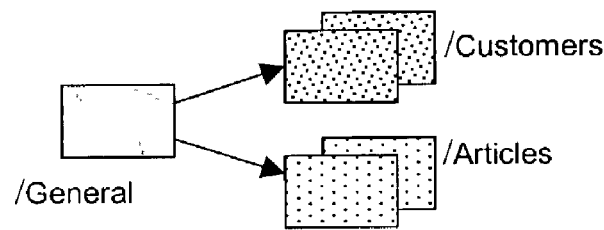
FIGS. 15(a)-15(c) illustrate an example implementation of the invention.

Example Implementation:

Consider a service provider using a web application to provide access to remote customers to data stored in the service provider's production database. The application consists of three virtual directories, as shown in FIG. 15(a). A first directory relates to general information relating to the service provider at http://www.address.com/General. A second relates to customers information and purchase orders at http://www.address.comlGeneral/Customers. A third relates to professional articles published by the service provider at http://www.address.com/General/Articles.

Figure 15B:
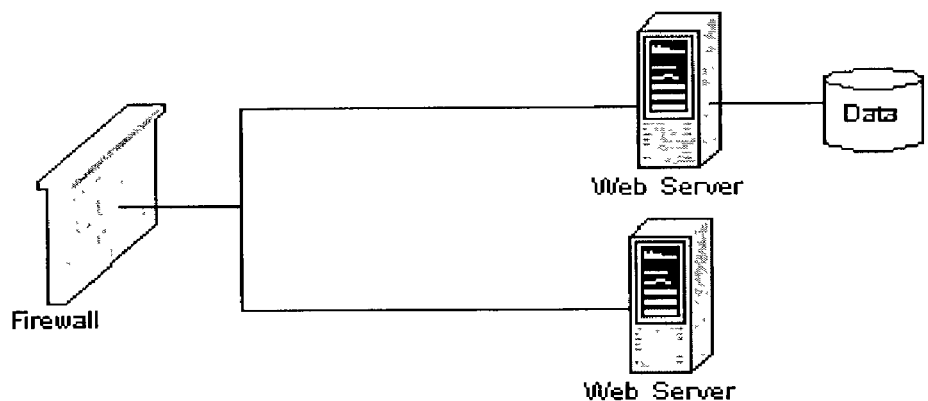
Figure 15C:
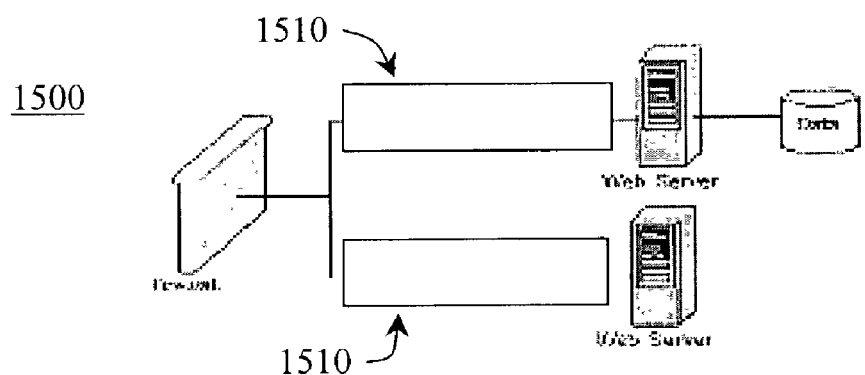

Referring to FIG. 15(b), the application architecture is as follows: two web servers running each on a separated machine, e.g., server01 at internet provider (IP) address at 10.0.0.2:80 and server02 10.0.0.3:80; a relational database; and a single firewall in front of the web servers at listen address 192.32.42.104/80.

Key application layer threats are determined to be: IT infrastructure known and unknown vulnerabilities; database manipulation; application's parameters poisoning; unpatched applications and servers; and buffer overflow. Accordingly, the following pipes are selected: MiniMe for vulnerability protection; Marabu for database protection; Inigo for service blocking; and Hide&Seek for poisoning protection.

The location of a security server is determined. For example, due to high traffic load (500 hit/sec) on each web server, installing a single security server in front of each web server is a must. Therefore, the selected topology will create two network segments: distrusted segment at 10.0.0.x and trusted segment at 165.120.1.x.

Tunnel and pipes are defined and installed. For example, tunnel 1 is characterized by listen address and port at 10.0.0.2:80, connect local address at 165.120.1.1, and back server address and port at 165.120.1.2:80; and tunnel 2 is characterized by listen address and port at 10.0.0.3:80, connect local address at 165.120.1.3, and back server address and port at 165.120.1.4:80.

Web application information is declared, e.g., name of service provider application, mode, and tunnel information. For example, mode is set to enabled. Further, tunnel information for tunnel 1 is characterized by: default page=/default.htm; application paths=/General, /Customers; assigned pipes=MiniMe, Marabu, and Hide&Seek. tunnel information tunnel 2 is characterized by: default page=/errors/oops.htm; application paths=/Articles; assigned pipes=MiniMe and Inigo.

In case of security event, the error page our message that the security server will reply to a client's request is defined for each Tunnel (web server). For example: tunnel 1 is /default.htm; and tunnel 2 is /errors/oops.htm;

Although the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A method for protecting an application from executing an illegal or harmful operation request received from a distributed environment, the method comprising the steps of:
   determining whether an operation request is illegal or harmful to an environment of an application,
   preventing said application from executing an illegal or harmful operation request, wherein said step of preventing comprises the step of modifying said illegal or harmful operation request into a legal or harmless operation request,
   comparing said operation request against stored known vulnerability patterns to determine a match, and
   blocking said operation request if said match is found,
   wherein said step of comparing comprises the steps of:
      converting every consecutive specified number of characters in said operation request into n-bits of binary code;
      computing a hash value for said every consecutive specified number of characters in said operation request; and
      comparing every hash value to stored hash values representing vulnerability patterns.

2. A method for protecting an application from executing an illegal or harmful operation request received from a distributed environment, the method comprising the steps of:
   determining whether an operation request is illegal or harmful to an environment of an application,
   preventing said application from executing an illegal or harmful operation request, wherein said step of preventing comprises the step of replacing said illegal or harmful operation request into a legal or harmless operation request,
   comparing said operation request against stored known vulnerability patterns to determine a match, and
   blocking said operation request if said match is found,
   wherein said step of comparing comprises the steps of:
      converting every consecutive specified number of characters in said operation request into n-bits of binary code;
      computing a hash value for said every consecutive specified number of characters in said operation request; and
      comparing every hash value to stored hash values representing vulnerability patterns.

3. A method for protecting an application from executing an illegal or harmful operation request received from a distributed environment, the method comprising the steps of:
   designating an application path of an application as restricted, determining whether an operation request is illegal or harmful to an environment of said application, preventing said application from executing an illegal or harmful operation request, wherein said step of determining comprises the step of checking said operation request for an existence of an embedded command causing database manipulation and wherein said step of preventing comprises the step of modifying said illegal or harmful operation request into a legal or harmless operation request, comparing said operation request against stored known vulnerability patterns to determine a match, and blocking said operation request if said match is found, wherein said step of comparing comprises the steps of:

converting every consecutive specified number of characters in said operation request into n-bits of binary code;

computing a hash value for said every consecutive specified number of characters in said operation request; and comparing every hash value to stored hash values representing vulnerability patterns.

4. The method of claim 3, wherein said embedded command is an SQL based command.

5. The method of claim 3, further comprising the steps of:
parsing said operation request into one or more expressions;
building a state-automate;
inspecting said one or more expressions for improper syntax and characters not defined in a first alphabet; and
applying said state-automate to said operation request.

6. The method of claim 5, wherein said alphabet is selected from the group consisting of: letters, digits, and encoded characters; blocks of letters; groups of said blocks; and any combination thereof.

7. A method for protecting an application from executing an illegal or harmful operation request received from a distrusted environment, the method comprising the steps of:
determining whether an operation request is illegal or harmful to an environment of an application,
preventing said application from executing an illegal or harmful operation request,
comparing said operation request against stored known vulnerability patterns to determine a match, and
blocking said operation request if said match is found, wherein said step of comparing comprises the steps of:
converting every consecutive specified number of characters in said operation request into n-bits of binary code;
computing a hash value for said every consecutive specified number of characters in said operation request; and
comparing every hash value to stored hash values representing vulnerability patterns.

8. The method of claim 7, wherein said n-bits is 8 bits and said specified number is equal to four.

9. A method for protecting an application from executing an illegal or harmful operation request received from a distributed environment, the method comprising the steps of:
determining whether an operation request is illegal or harmful to an environment of an application;
comparing said operation request against stored known vulnerability patterns to determine a match, and
blocking said operation request if said match is found, wherein said step of comparing comprises the steps of:
converting every consecutive specified number of characters in said operation request into n-bits of binary code;
computing a hash value for said every consecutive specified number of characters in said operation request; and
comparing every hash value to stored hash values representing vulnerability patterns;
preventing said application from executing an illegal or harmful operation request;
sending a legal or harmless operation request to said application;
generating a reply to said operation request.

10. The method of claim 9, wherein said step of determining further comprises the steps of:
determining a first set of internal URLs and parameters values contained in said reply;
receiving a second operation request in response to said reply;
comparing a second set of internal URLs and parameters values contained in said second operation request with said first set to determine if said sets correspond; and
rejecting said second operation request if said sets do not correspond.

11. The method of claim 9, further comprising the steps of:
identifying a single client to interact with said application;
determining a first set of parameter names and values in said reply;
receiving a second operation request from said client in response to said reply;
determining a second set of parameter names and values in said second operation request; and
forwarding said second request to said application only if said first set matches said second set.

12. The method of claim 9, further comprising the steps of:
identifying a cookie message header in said reply;
encrypting values in said cookie message header; and
modifying said reply to reflect said encrypted values.

13. A method for protecting an application from executing an illegal or harmful operation request received from a distributed environment, the method comprising the steps of:
determining whether an operation request is illegal or harmful to an environment of an application;
comparing said operation request against stored known vulnerability patterns to determine a match, and
blocking said operation request if said match is found, wherein said step of comparing comprises the steps of:
converting every consecutive specified number of characters in said operation request into n-bits of binary code;
computing a hash value for said every consecutive specified number of characters in said operation request;
comparing every hash value to stored hash values representing vulnerability patterns; and
preventing said application from executing an illegal or harmful operation request, wherein said step of determining comprises the steps of:
identifying a cookie message header in said operation request;
decrypting values in said cookie message header; and
modifying said operation request to reflect said decrypted values.

14. A method for preventing one or more applications from executing out of their intended scopes of operation, comprising the steps of:
  receiving one or more operation requests;
  formatting each operation request into a formatted message according to a designated communications protocol, wherein said designation communication protocol is determined by the type of application being requested;
  indexing said one or more formatted messages;
  storing a copy of said indexed one or more formatted messages;
  translating said formatted messages into internal messages according to an encoding scheme;
  resolving a destination node for each operation request;
  matching each operation request to an application path, wherein said application path is a virtual directory or a subdirectory of said application; and
  determining whether each operation request is illegal or harmful to an environment of said application, wherein said step of determining comprises the step of:
    applying one or more security pipes to each operation request, wherein the number and types of pipes applied to each operation request are based on said resolved destination node of each operation request, wherein application of a pipe comprises the steps of:
      parsing a first operation request into one or more expressions;
      building a state-automate;
      inspecting said one or more expressions for improper syntax and characters not defined in a first alphabet; and
      applying said state-automate to said first operation request.

15. The method of claim 14, wherein said alphabet is selected from the group consisting of: letters, digits, and encoded characters; blocks of letters; groups of said blocks; and any combination thereof.

16. A method for preventing one or more applications from executing out of their intended scopes of operation, comprising the steps of:
  receiving one or more operation requests;
  formatting each operation request into a formatted message according to a designated communications protocol, wherein said designation communication protocol is determined by the type of application being requested;
  indexing said one or more formatted messages;
  storing a copy of said indexed one or more formatted messages;
  translating said formatted messages into internal messages according to an encoding scheme;
  resolving a destination node for each operation request;
  matching each operation request to an application path, wherein said application path is a virtual directory or a subdirectory of said application; and
  determining whether each operation request is illegal or harmful to an environment of said application, wherein said step of determining comprises the step of:
    applying one or more security pipes to each operation request, wherein the number and types of pipes applied to each operation request are based on said resolved destination node of each operation request, wherein application of a pipe comprises the steps of:
      comparing said operation request against stored known vulnerability patterns to determine a match, wherein said step of comparing comprises the steps of:
        converting every consecutive specified number of characters in said operation request into n-bits of binary code;
        computing a hash value for said every consecutive specified number of characters in said operation request; and
        comparing every hash value to stored hash values representing vulnerability patterns; and
      blocking said operation request if said match is found.

17. The method of claim 16, wherein said n-bits is 8-bits and said specified number is equal to four.

18. A method for preventing one or more applications from executing out of their intended scopes of operation, comprising the steps of:
  receiving one or more operation requests;
  formatting each operation request into a formatted message according to a designated communications protocol, wherein said designation communication protocol is determined by the type of application being requested;
  indexing said one or more formatted messages;
  storing a copy of said indexed one or more formatted messages;
  translating said formatted messages into internal messages according to an encoding scheme;
  resolving a destination node for each operation request;
  matching each operation request to an application path, wherein said application path is a virtual directory or a subdirectory of said application;
  determining whether each operation request is illegal or harmful to an environment of said application, wherein said step of determining comprises the step of:
    applying one or more security pipes to each operation request, wherein the number and types of pipes applied to each operation request are based on said resolved destination node of each operation request;
  sending legal or harmless operation requests to said operation; and
  generating a reply to said operation request.

19. The method of claim 18, wherein application of a pipe comprises the steps of:
  determining a first set of internal URLs and parameters values contained in said reply;
  receiving a second operation request in response to said reply;
  comparing a second set of internal URLs and parameters values contained in said second operation request with said first set to determine if said sets correspond; and
  rejecting said second operation request if said sets do not correspond.

20. The method of claim 18, wherein application of a pipe comprises the steps of:
  identifying a single client to interact with said application;
  determining a first set of parameter names and values in said reply;
  receiving a second operation request from said client in response to said reply;
  determining a second set of parameter names and values in said second operation request; and
  forwarding said second request to said application only if said first set matches said second set.

21. A method for preventing one or more applications from executing out of their intended scopes of operation, comprising the steps of:

receiving one or more operation requests;

formatting each operation request into a formatted message according to a designated communications protocol, wherein said designation communication protocol is determined by the type of application being requested;

indexing said one or more formatted messages;

storing a copy of said indexed one or more formatted messages;

translating said formatted messages into internal messages according to an encoding scheme;

resolving a destination node for each operation request; and applying one or more security pipes to each operation request, wherein the number and types of pipes applied to each operation request are based on said resolved destination node of each operation request, and wherein application of a pipe comprises the steps of:

identifying a cookie message header in said operation request;

decrypting values in said cookie message header; and modifying said operation request to reflect said decrypted values.

22. A method for preventing one or more applications from executing out of their intended scopes of operation, comprising the steps of:

receiving one or more operation requests;

formatting each operation request into a formatted message according to a designated communications protocol, wherein said designation communication protocol is determined by the type of application being requested;

indexing said one or more formatted messages;

storing a copy of said indexed one or more formatted messages;

translating said formatted messages into internal messages according to an encoding scheme;

resolving a destination node for each operation request; and applying one or more security pipes to each operation request, wherein the number and types of pipes applied to each operation request are based on said resolved destination node of each operation request, and wherein application of a pipe comprises the steps of:

identifying a cookie message header in said reply;

encrypting values in said cookie message header; and modifying said reply to reflect said encrypted values.

* * * * *

UNITED STATES PATENT AND TRADEMARK OFFICE
CERTIFICATE OF CORRECTION

PATENT NO. : 7,313,822 B2  
APPLICATION NO. : 09/809030  
DATED : December 25, 2007  
INVENTOR(S) : Yuval Ben-Itzhak Page 1 of 1

It is certified that error appears in the above-identified patent and that said Letters Patent is hereby corrected as shown below:

Title Page;  
At (73) Assignee, replace "Protegrity Corporation" with --Kavado, Inc.--

Signed and Sealed this

Tenth Day of November, 2009

David J. Kappos  
*Director of the United States Patent and Trademark Office*